United States Patent [19]
Moreno

[11] 3,971,916
[45] July 27, 1976

[54] METHODS OF DATA STORAGE AND DATA STORAGE SYSTEMS

[75] Inventor: Roland Moreno, Paris, France

[73] Assignee: Societe Internationale, France

[22] Filed: Mar. 21, 1975

[21] Appl. No.: 560,873

[30] Foreign Application Priority Data
Mar. 25, 1974   France .............................. 74.10191
Mar. 17, 1975   France .............................. 75.08184
Mar. 17, 1975   France .............................. 75.08185

[52] U.S. Cl. ...................... 235/61.7 B; 235/61.8 R; 235/61.12 N; 340/172.5
[51] Int. Cl.² ..................... G06K 5/00; G06K 1/14; G06K 19/00; G06F 7/02
[58] Field of Search ............... 235/61.12 N, 61.7 R, 235/61.7 B, 61.8 R, 61.8 A; 340/149 R, 149 A, 172.5; 179/2 CA, 6.3 CC

[56] References Cited
UNITED STATES PATENTS
3,637,994   1/1972   Ellingboe .................... 235/61.12 N
3,906,460   9/1975   Halpern .......................... 340/172.5

Primary Examiner—Daryl W. Cook

[57] ABSTRACT

Data, for example, data relating to a bank account, is carried on the person in the form of a small portable means such as a flat card containing encapsulated logic microstructures. The circuitry includes a memory and its control circuits, with inhibitor means preventing access to predetermined sections of the memory. The portable means cooperates with data-transfer means provided at fixed locations. Credit entries in the card are summed and the debit entries are summed and subtracted from the credit entries. Any credit balance may be used to effect a purchase or to obtain an issue of cash money. Coupling of the card and data-transfer means is effected optically by light-emitting diodes cooperating with photovoltaic piles, or by direct electrical contact. Prohibited memory sections carry a code actuating a lock-out latch system. Alternatively a predetermined collection of addresses in the memory is prohibited, setting up one of these addresses actuates the lock-out.

38 Claims, 19 Drawing Figures

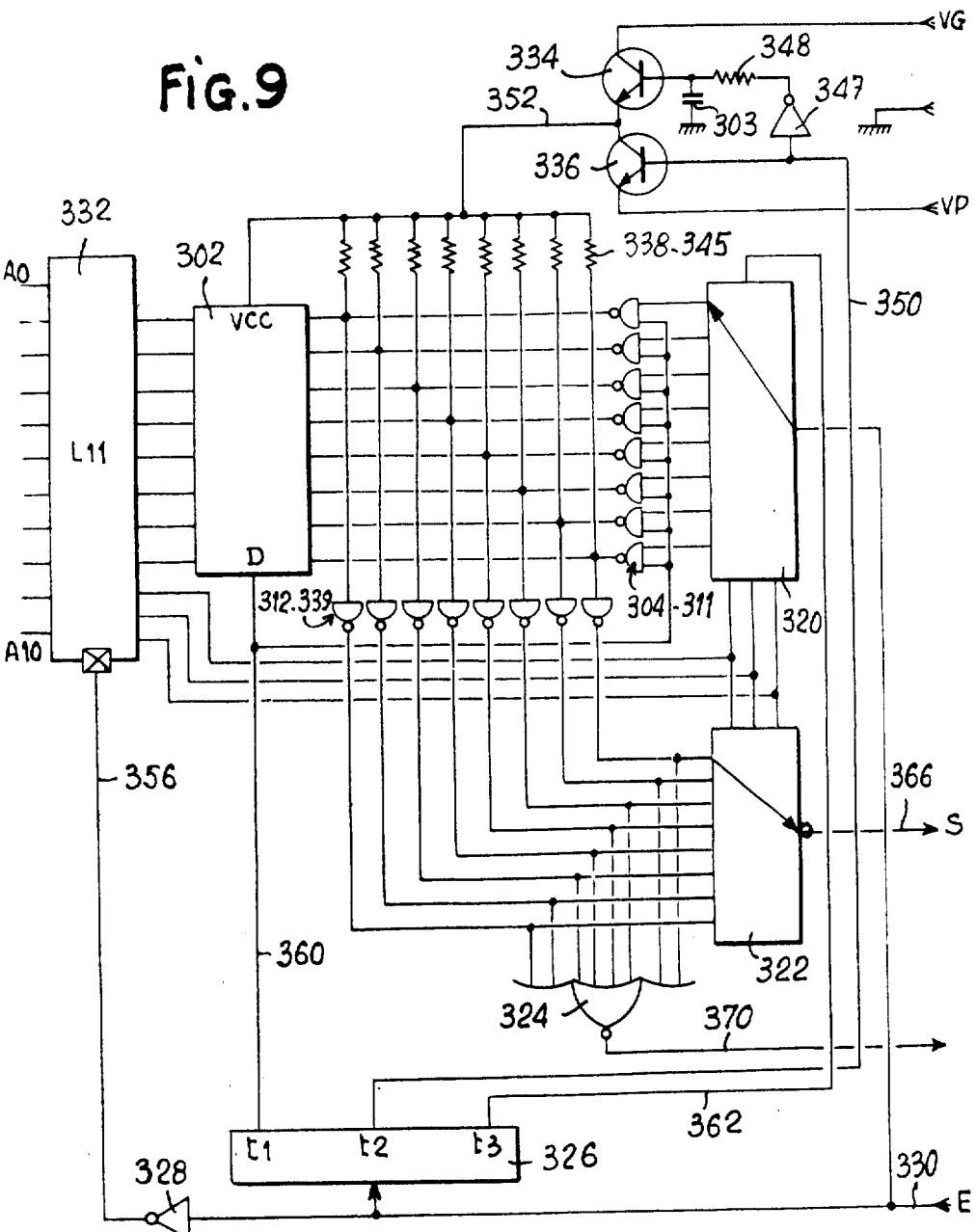

METHODS OF DATA STORAGE AND DATA STORAGE SYSTEMS

This invention relates to methods of storing data and to data storage systems.

A first known series of systems comprises at least one portable device including a memory containing stored data and at least one transfer device constituted generally by a peripheral unit connected to a central computer comprising means whereby data may be transferred between the memory in the portable device and the central computer.

The person carrying the portable device introduces this latter into the peripheral unit and temporarily couples it with the central computer. The data contained in the memory of the portable device are transferred to the central computer which processes and analyses them. The data thus processed generally serves subsequently to control various mechanisms. Thus, for example, it is possible by means of such a system to control the opening of a door or the issue of bank-notes: the portable device plays the part of an electronic key, allowing the person who possesses it to make himself known by means of the data contained in the portable device and to control the operation of the associated mechanisms.

Such a system has been used in particular for the dispensing of bank notes by means of credit cards. Such systems suffer from major disadvantages which arise from the fact that the memory in the portable device is constituted by a magnetic track; these inconveniences are as follows:

the contents of the memory may be erased by heat or by a magnetic field, its storage capacity is relatively small; as a result the identification data are limited in number;

the contents of the memory may be readily reproduced on other devices, this is particularly awkward in the case of theft or fraud, the contents of the memory may be modified with the aid of relatively simple equipment (a plastics lens and a magnetized needle);

as in all systems using recording on magnetic tapes, it is necessary to place the device to be placed close to the magnetic reading head; in addition, the process is electro-mechanical, that is to say, the magnetic track must be displaced with respect to the reading head in order to develop a signal.

To overcome these difficulties it has been proposed to make use of integrated-circuit inert memories, of the semiconductor type or making use of fusible links; in particular a portable device including a particular embodiment of this type of memory has been described in U.S. Pat. No. 3,702,464.

In addition — and whatever the construction of the memory; — magnetic or semi-conductor — the known systems present another major difficulty which arises from the fact that these systems are not devised to prevent, temporarily or permanently, certain data contained in the memory (or capable of being contained in the memory) from being read by the transfer device and extracted from the memory. Similarly, they are not arranged, temporarily or permanently, to prevent certain data transferred into the memory (or into certain zones of the memory) from being altered by new data being entered.

In practice, in many applications, it is necessary to reserve certain strictly defined sections in the memory and to prohibit their contents from being modified or read, temporarily if not permanently; these predetermined sections may be:

empty of all information; this is specifically the case when, for example, the portable device comprises also associated processing and writing means arranged to enter into the memory data resulting from the processing; in this case it is necessary in practice to retain portions of the memory empty of all information and to prohibit the entry therein of all entries originating externally of the portable device, or may contain preset information which it is desired to preserve without it being possible for it to be modified or read.

It is particularly essential (as will be seen) to solve such a problem when the memory system is used to deal with bank accounting.

A second series of systems for data storage is known which comprises:

at least one portable device comprising a memory arranged to store data, at least one transfer device constituted generally by a peripheral unit connected to a central computer comprising means for transferring data between the central computer and the memory in the portable device (and possible reciprocally).

By the use of such a system it is possible to store data originating in a central computer in a readily transportable form and to carry them to some other location.

Such a system has been described, for example, in French Pat. No. F.7007187. The portable device described in this patent comprises a magnetic memory; as a result of which it presents the same inconveniences which have just been described and which are due to the magnetic construction of the memory.

To a certain extent, U.S. Pat. No. 3,702,464 suggests the use as a memory of an integrated circuit inert memory using semiconductor devices, of a special type, and the transfer of data into such a memory. However, it does not point out the means for effecting this transfer and does not set out in detail the manner of the transfer.

Furthermore, and whatever the construction of the memory, magnetic or semiconductor; the known systems present another major inconvenience which arises from the fact that the systems are not devised to transfer and store (in as small a volume as possible) data originating at geographically distinct locations in random order. In other words, the known systems are not devised to enter each new set of data into a distinct section of the memory — while utilising to the maximum the whole of the available sections of the memory — and to inhibit any modification of the contents of the sections already written.

This inconvenience is serious; in practice, in a good number of applications, especially in applications to banking (as will be seen), it is essential to use the useful capacity of the memory to the full, without being able to alter the contents of already programmed sections. Now, specifically, in the case of such banking application, an individual portable device cooperates with a multitude of transfer devices without any connection between them, so that a given transfer device is necessarily ignorant of the addresses of the sections empty of all entries, and particularly of that empty section adjacent to the last section in which an entry was made. It is therefore essential to solve this problem.

The present invention relates more especially to data storage and transfer systems of the kind described above (those of the first and also those of the second series) and has the object of overcoming the difficulties which they present.

The object of the present invention is as follows: to provide a system permitting the transfer of data between a transfer device and a portable device comprising a memory and/or, reciprocally, to transfer data between a memory contained in a portable device and a transfer device. In addition, the transfer should be effected in accordance with the two following supplementary characteristics, taken separately or in combination:

1. The system should be capable of effecting the transfer in an erratic and discontinuous manner, that is to say, in such a manner that:

a single portable device may be associated at different times and in any order with several different transfer devices, several portable devices may be associated at different times and in any order with the same transfer device.

The problem to be solved is as follows: a system must be devised such that erratic entry of new data into the memory of the portable device does not modify the data already entered (of which it is not generally possible to know the existence) and takes place automatically in empty portions of the memory.

2. The system should permit transfer to be effected in such a manner that:

certain data contained in the memory (or capable of being contained in the memory) cannot be temporarily or finally read by the transfer device and extracted from the memory.

certain data transferred into the memory cannot be temporarily or permanently modified.

The problem to be solved is as follows: it is necessary to devise a system such that certain data cannot be re-read and/or entered and or re-entered into the memory, temporarily or permanently.

More generally, it may be said, combining the two supplementary characteristics into a single formula, that the object of the present invention is, in addition, to effect the data transfer in such a manner that the contents of certain predetermined sections of the memory shall be inaccessible for reading or writing from outside the device, either temporarily or permanently.

Thus it is an object of the invention to provide a system capable of presenting, in addition to the functional characteristics set out above the advantage of being as little susceptible to mis-use as possible; that is to say, to provide a system such that it is difficult to modify the contents of the memory of the portable device irregularly in favour of the user. It would be utopian to claim that a system is entirely safe against fraud or is incapable of being overcome; on the other hand it is reasonable to maintain that, among several systems, some are less subject to fraud than others owing to the technical difficulties which must be overcome by the fraudulent to produce a modification in their favour.

It is stressed that none of the known systems described above attains the object of the invention, in particular, the two supplementary objects set out as points 1) and 2). The present invention has for the first time proposed and solved a problem of which the importance in practice is very considerable, as will be seen.

In order to attain its object, a system in accordance with the invention comprises:

at leasst one independent protable electronic device, at least one transfer device.

In accordance with the invention the portable device includes:

at least one memory arranged to store data in a readily transportable form, externally accessible coupling means allowing the portable device to be temporarily coupled with the transfer device, memory control circuits interconnected between the coupling means and the memory, permitting access to the memory and allowing the circulation of data into and out of the memory.

Preferably the memory and the control circuits are constructed in the form of logic microcircuits; preferably likewise the portable device does not require a power supply and the memory is an inert memory. More particularly again, the inert memory is of the semi-conductor type; this semiconductor inert memory may be reprogrammable (that is, erasable) or write-only (that is, non-erasable). Finally, this memory is, for preference, incorporated in an inaccessible manner in the interior of the portable device.

These particular constructions and arrangement of the memory contribute in an essential manner to making the system of the invention highly resistant to fraud.

The transfer device comprises:

coupling means complementary to those of the portable device, transfer means connected to the coupling means, these transfer means being arranged to introduce data into or extract data from the memory; these transfer means are composed more particularly of writing means and/or reading means.

According to the principal characteristic of the present invention, the system is characterized by the fact that it includes, in addition, transfer inhibiting means (that is, means operable to inhibit the reading and/or writing means), prohibiting the reading of and/or any modification of the data stored in predetermined sections of the memory.

Thanks to these inhibiting means, the said predetermined sections of the memory in the portable device remain in that state in which they were at the instant at which the inhibiting means was actuated, and during the whole time in which these means are active; it is no longer possible to read their contents.

The inhibiting means may be arranged either in the transfer device or in the portable device; preferably, however, so as to make the system as little susceptible to fraud as possible, the inhibiting means are interconnected with the memory control means and are situated in the portable device; preferably they are incorporated in this latter in as inaccessible manner as possible.

The manner of realisation of the system according to the invention, more particularly devised so that the writing of new data into the memory of the portable device shall not alter the contents of the data already entered and will take place automatically in the empty portions of the memory, is characterized by the fact that:

the transfer means comprises means for writing data into the memory of the portable device, the memory of the portable device, in cooperation with the control circuits, is organised in a plurality of distinct sections, each arranged to receive one word, the means inhibiting the writing means, preferably situated in the portable device, consists of a means detecting unprogrammed sections of the memory:

prohibiting the activation of the writing means in the case where the section considered is already programmed, allowing the actuation of the writing means in the case where the section considered is not programmed, so as to write a new dats into that section.

In addition, the detector is devised to memorise the writing command for the duration of a complete writing cycle.

Thanks to this detector new data cannot be written into an already programmed section of the memory, whatever may be the means brought into use; in addition, all new data is automatically written into a non-programmed section of the memory.

Preferably the non-programmed section detector is placed in the portable device and interconnected with the memory control means. Thanks to this arrangement, the fraudulent modification of the contents of the programmed memory sections is not possible, since the would-be fraudulent operator has no possibility of access to the detector so as to remove its influence, without risking the destruction of the memory and of its control circuits.

Preferably the non-programmed memory section detector comprises:

a first gate receiving in parallel the contents of the relevant section of the memory (for example, and AND gate when the unwritten bits correspond to the logic level 1), a second gate for allowing a write operation, enabled by the first gate in the case where the relevant memory section does not contain any data and enabling the energization of the writing means, a memory circuit interposed between the first and second gates and arranged to store the active state of the first gate (at least during one writing cycle).

The memory circuit has the function of maintaining the enabling of the writing function despite the fact that the first bit written-in affects the state of the respective section. In addition, the non-programmed memory section detector preferably includes an inhibiting circuit interposed in the memory addressing circuit, actuated by the first gate through the intermediary of the memory circuit; this inhibiting circuit is arranged to prevent the addressing of the non-programmed section of the memory during the whole of the writing cycle.

Owing to this arrangement, a fraudulent operator is unable to address the memory as he wishes, for example, at a page already written, during the writing cycle; in addition, this arrangement permits inhibition of addressing during wiriting, which is desirable in order to avoid errors of electronic origin.

The manner of carrying out a system in accordance with the invention, more particularly devised so that certain data contained in the memory (or susceptible of being contained in the memory) cannot be read and/or written and/or re-written, temporarily or permanently, is characterized by the fact that:

the transfer-inhibiting means (means inhibiting reading and/or writing) include:

means for coding the predetermined inhibitied sections, means for detecting the coded inhibited sections, inhibiting the actuation of the transfer means in the case where the relevant section carries an inhibit code, enabling the actuation of the transfer means in the case where the relevant section does not carry an inhibit code.

Such a combination makes it possible:

to inhibit reading or writing, before or after writing, in such a section or sections of the memory of the portable device, to inhibit reading or writing, temporarily or permanently, in such a section or sections of the memory; following upon the moment when the coding and detector means are set in action (before or after writing) and the time during which they remain active.

With a view to solving particular problems posed by applications of this system in banking, and in particular to frustrate attempts at fraud, it is preferred, in accordance with an optional characteristic of the present invention, the coding and detector means are incorporated within the interior of the portable device, in a manner such that they are inaccessible from outside the device.

Owing to this arrangement it is impossible, whatever the means adopted by a would-be fraudulent operator, to obtain access to the memory and to modify or read its contents.

The means for coding and detecting predetermined prohibited sections may be of different natures. In the case where the memory is organised in words of $n$ bits and comprises input/output circuits (for writing and reading) composed of $n$ conductors, the coding means may consist of one of the bits of the word.

The detector means, connected to the conductor of the input/output circuit corresponding to the code bit, may in particular be composed of a write-enable gate (an AND gate in the case where the bit is coded 0 to denote a prohibited section) prohibiting all writing in the case where the relevant section is prohibited. Preferably and in accordance with an optional feature of the invention, the code is the $n$th bit of the word, the useful part of the word consisting of $n - 1$ bits. Owing to this arrangement the coding of the $n$th bit inhibits writing only after this has been effected on the $n - 1$ usful bits of the word. It is clear that such an arrangement solves the particular problem posed by the banking application considered. In practice, provided that the number of the bank account or the identification number has been written into the portable device and that the $n$th bit has been altered (set to the 0 state), it is no longer possible to change the entry.

The coding and detecting means for predetermined sections may be arranged in another manner. Thus the coding means may be composed of diode matrices, of inert memories, or simply of connecting points, while the detecting means may comprise at least one address comparator interconnected between the memory addressing circuit and the coding means; this address comparator inhibiting a writing-enable gate in the case where the address considered is an address coded as prohibited.

Preferably, and with the object of solving the particular problem arising from banking applications, the coding means is programmed in an irreversible manner during the construction of the portable device (credit card) and before being incorporated into this latter, so that it is no longer possible to recode it differently without destroying the card; the addresses of the prohibited sections are thus determined once and for all. In this case, in order to permit the entry into the prohibited sections of confidential and personal data (such as the number of the bank account or the identification data) by the organisations responsible for so doing (the bank, etc)., there is further provided in the portable device a special means, at the disposal of this organisation, arranged to deactivate the means inhibiting writing. This special means comprises another gate interposed between the address comparator and the gate enabling writing; this other gate may be permanently held conductive by irreversible modification of an actuating circuit. The organization responsible for establishing the confidential data is then able, owing to this special means, to put out of action the writing inhibiting means before the entry of the confidential data and to activate the writing means (the coding and detector means) after the entry of the confidential data.

The data storage system in accordance with the invention, having the stated characteristics, is suitable for a large number of practical applications; the following applications may be especially mentioned:

keeping a bank account,
issue of bank-notes,
keeping a medical record,

For instance, in the case of controlling a bank account, the client keeps possession of a portable device (in the form of a credit card, for example) containing a memory storing the following information:

the personal entitlement code,
the number of the bank account,
the name of the client,
the serial number of the card,
a list (with or without dates) of the various debit operations,
a list (with or without dates) of the various credit operations.

The trader is provided with a transfer device in the form of a cash register, permitting him to read the contents of the card and to write into it new data, particularly the date and the amount of the purchase effected.

The account is kept in the following manner:

A transfer device, installed at the point of sale, examines the credit available shown in the client's card by comparing the sum of the debits with the sum of the credits; this transfer device then compares this available credit with the amount of the intended purchase, if this is sufficient, the transfer device modifies the memory in the client's card by writing into it the amount of the purchase effected.

Afterwards, the transfer device enters in a local electronic store the number of the client's bank account and also the amount of the expenditure icurred.

The trader then puts the operation in order with his own bank, communicating to this latter the bank coordinates of his clients and the amounts of their purchases recorded by the transfer device; the bank will debit the banker accounts of the various clients with the amounts of their purchases and will credit the account of the trader with these amounts.

It is therefore essential for keeping a bank account to have available a system:

preventing any modification (accidental or fraudulent) of the contents of the memory, especially of the permenent sections in which there are stored the banking coordinates of the client and his personal entitlement code, detecting the already written sections of the memory so as not to modify their contents, detecting unwritten sections of the memory so as to write all new data therein.

The system of the present invention is therefore particularly well adapted for such a banking application, particularly because it is difficult to effect any fraud.

Non-limiting examples of certain embodiments of a data storage and transfer system in accordance with the invention will now be described with reference to the drawings, in which:

FIG. 9 shows a memory module organised in $mn$ words of 1 bit, by means of a primary memory organized in $m$ words of $n$ bits;

FIG. 10 is a symbolic representation of the memory module described with reference to FIG. 9;

Figure 1:
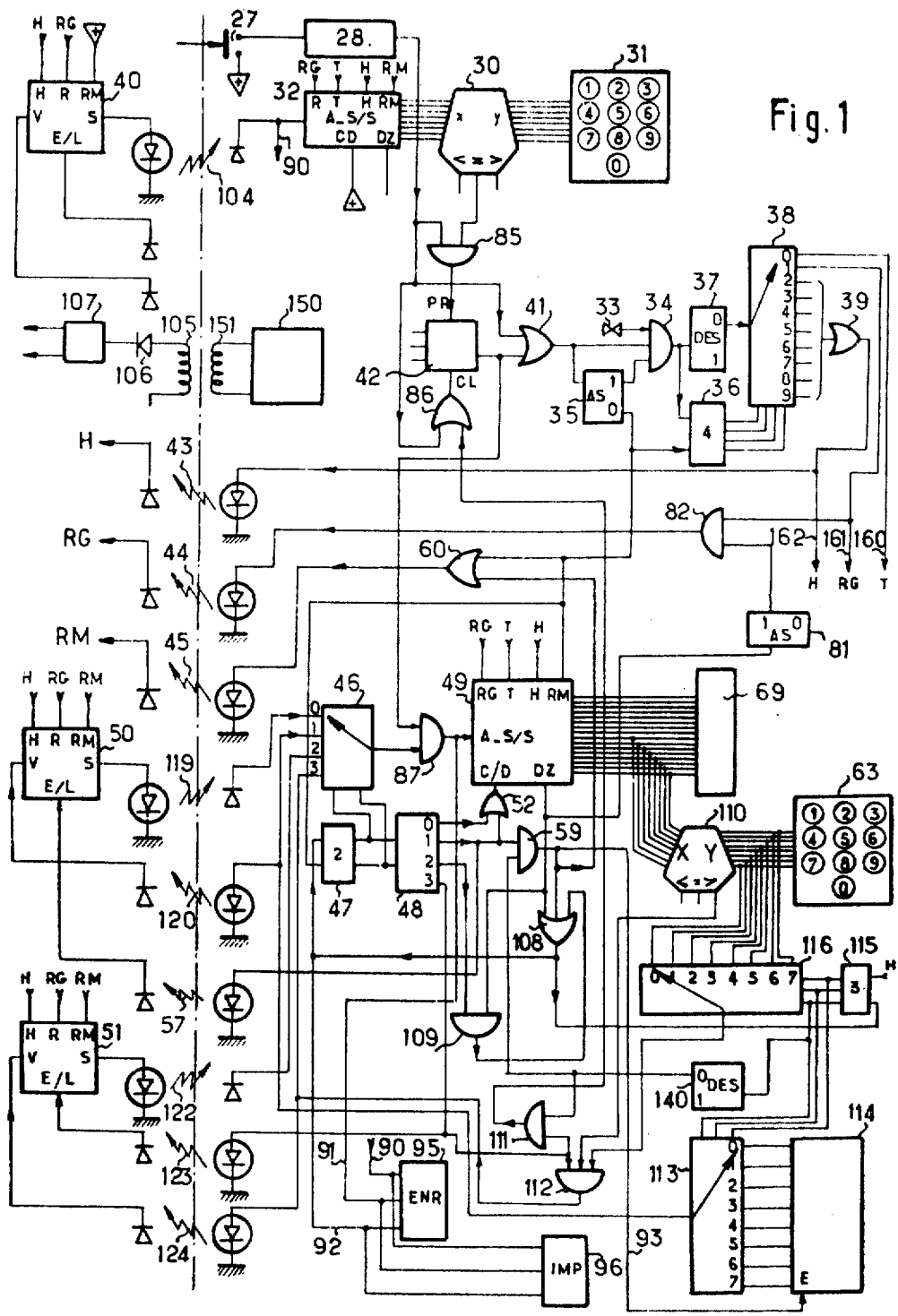
FIG. 1 is a schematic representation of the application of a system according to the invention to the issue of bank-notes.

The description which is about to follow requires the following general remarks:

All the forms of construction described below, of memory systems in accordance with the invention, are more particularly intended for banking and accountancy applications; as a result, and in order to facilitate reading, the manner of operation and the effects of the various devices has been for the most part described using terminology appropriate to banks and to the keeping of a bank account. The various embodiments may however have quite different applications and may be used in all cases where it is necessary to store data, particularly in a confidential and irreversible manner.

The electronic circuits of all the embodiments herein below described are, because of their application in banking, incorporated in an inaccessible manner in a portable device, advantageously in the form of a flat rectangular card. There are incorporated in it in an inaccessible manner, that is to say that it is not possible to obtain access to the electronic circuits without destroying them; this result may be obtained in particular by constructing them in the form of logical micro-structures (integrated circuits) and by incapsulating them in an opaque plastics resin, but other mechanical solutions can be envisaged. In the figures relating to the portable device (the card), there has been indicated by a broken line the boundaries of those parts of the circuits which are electrically or optically inaccessible from the exterior.

Only the coupling means allow access, either electrical or optical, to electronic components contained in the interior of the card.

It should be noted, however, that for other applications not requirinng intensive protection against attempts at fraudulent interference with the contents of the card, some — if not the whole — of the elements comprising the inhibitor means may be situated on the exterior of the card, particularly in the portable device. Similarly, for other applications, the precautions taken to incorporate the circuit in an inaccessible manner in the card are unnecessary.

In addition, in order to simplify so far as possible the description of the electronic circuits, the supply circuits, etc, have not been represented and only the functionally essential circuits are shown. However, care has been taken to indicate, as regards the coupling means, by references such as VP, VG, earth (which designate respectively the source of writing voltage, the general supply source for the logic circuits and the nought volt line), the feed connections which it is necessary to establish between the card and the particular exterior arrangements.

Finally, it should be noted that the inert integrated-circuit memories employed in these embodiments may be of different kinds; particularly either of the programmable or of the re-programmable type. Such memory devices do not require any energy to store the information. On the contrary, the writing of information generally requires a substantial amount of energy (several watts instantaneously); in consequence, the constructors guarantee an extremely long storage time, of the order of several tens of years in the case of re-programmable memories. The following references to the type of memory may be given:

Intel 1702 and National Semiconductor 5203; These memories are erasible by exposure to a source of ultra violet radiation or of x-rays;

Harris 7620, Monolific Memories 6340, Texas Instruments 74 S 387, Intersil 5604; These latter non-erasible (destructible) memories are of the fusible or junction-break down type.

Memories with capacities of 4096 bits are currently fabricated by certain makers, particularly in the field of MOS (erasible) memories. Modern processes for the inter-connection of integrated circuit chips thus allow the construction at low cost of a block memory of 16 kilobits or 32 kilobits (4 or 8 chips) in an area of some tens of square millimetres, adding to these the special circuits which are the object of the present invention the block may be included in a card having the dimensions of 2 × 60 × 80 mm.

These inert intergrated — circuit memories of the semi-conductor type present very appreciable advantages, as compared with other inert memories such as magnetic cassettes, flexible discs, etc. In fact they are more reliable, their dimensions are less, they do not require mechanical movement for reading and writing, they are insensitive to magnetic fields, they are difficult to counterfeit and to interfere with (an intending fraudulent operator must make use of complex electronic means to modify the state of an inert semiconductor memory). As a result, these inert semicondutor memories are particularly well adapted to be used, in preference to others, in memory systems in accordance with the invention; in particular in applications of these systems in banking. The various forms of construction of the memory system in accordance with the invention are all essentially distinguished by the structure of the portable device; in order not to repeat the description of the transfer arrangement associated with the portable device several times (with reference to each modified embodiment) only two examples of this are described. A detailed description is given with reference to FIGS. 1 and 3 and a general synoptic description with reference to FIGS. 7 and 8.

It will be clear, however, to those skilled in the art that each of the portable devices which are illustrated in the drawings may be associated with a transfer device presenting all or part of the characteristics of the transfer arrangements described.

The system in accordance with the invention which is shown in FIG. 1 comprises two distinct parts which, in operation, are connected by an interface symbolised by chain line. The two parts of the device are as follows:

To the left of the chain line: a portable device not requiring a power supply, advantageously a ring, a card, a pendant, a pen, incorporating a certain number of electronic circuits (carried out for example as integrated circuits);

To the right of the chain line: a device to be controlled, advantageously a bank-note issuing device, or a cash register in the case of direct use at the point of sale; in this latter case, the debiting operation described above is not accompanied by the supply of bank-notes but the writing into the cash register of the trader of information ultimately permitting the latter to obtain from the bank of the carrier of the ring (etc), a repayment in cash or script.

For clarity, we have restricted this description to the assumption of the issue of bank-notes, otherwise the electronic arrangements are exactly similar to those which would be used for a cash register.

The circuits in the ring comprise an identification memory 40, a debit memory 50 and a credit memory 51. The system allows the following operations to take place in the course of a single utilisation: identification of the carrier of the ring, an operation which authorises or rejects the remainder of the operation; possible reading of a document relative to an authorisation of credit and copying of the sum to be credited from this document into the credit memory in the ring; debiting in case money a required sum, if, and only if, the state of account of the carrier of the ring allows it, taking into account the amount of the sum; recording of the whole of this process, at the end of accounting and/or possible final checking on a support such as a semiconductor memory, magnetic disk or tape, cassette, etc.

The operation is to be effected by the carrier of the ring are as follows:

Possible introduction of a credit authorisation into the reader 144 setting up on the keyboard 31 of the confidential identification number.

possible setting up of the sum to be debited on keyboard 63; these three preliminary operations may be effected in a different chronological order;

finally, introduction of a projecting portion of the ring into a corresponding receptical provided on the distributor box.

At the moment when the carrier of the ring effects the last operation which he must perform, that is to say, the introduction of the ring into the distribution box, all the operations set out above are effected very rapidly. The arrangement will have finished its operation almost instantaneously, permitting one of the following results, which are made possible according to the choice of the carrier ring and the state of his account;

simple verification of the state of the account by numerical display of the sum on a display means 69;

verification of the state of the account after the introduction of a sum to be credited by the introduction of an authorisation of credit, which is absorbed, erased or destroyed in some manner not shown after the sum to be credited has been written into the credit memory of the ring;

verification of the state of the account after the introduction of credit, and a debit operation in cash money by the distributor, the credit state of the account after these two operations being necessarily positive or zero;

verification of the state of account after such money has been debited by the distributor, as in the preceding case the debit will not take place unless it corresponds to a positive or zero amount left in the account.

Figure 2:
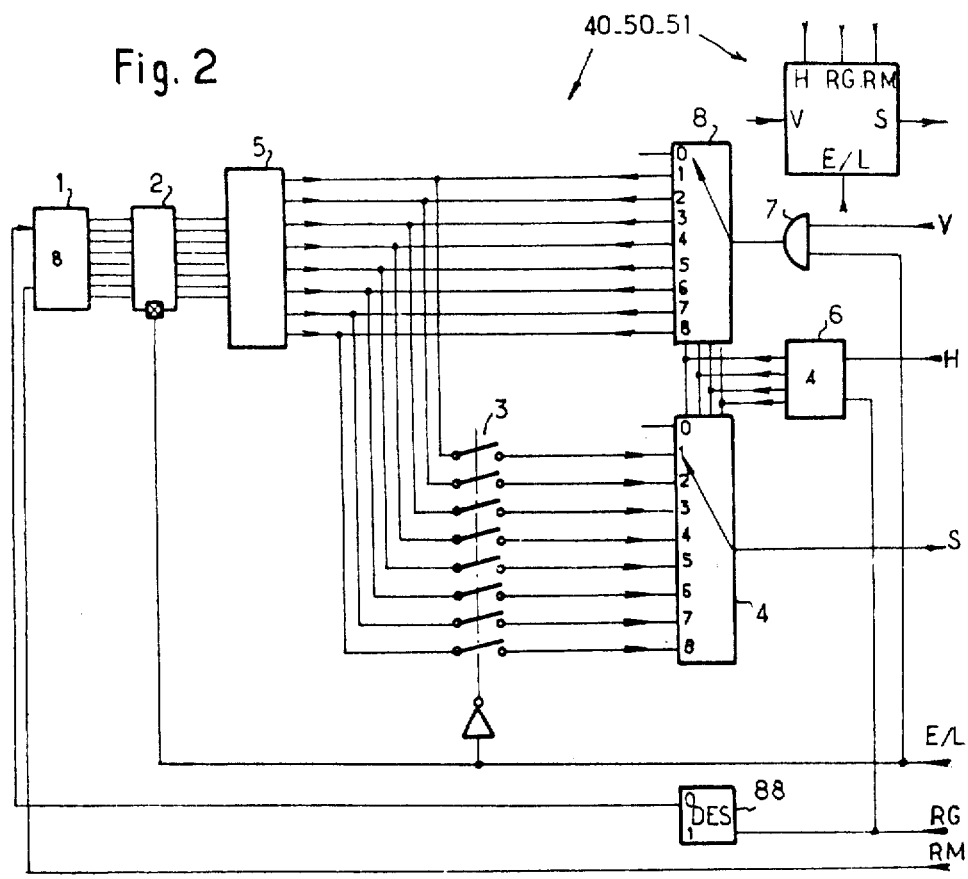
FIG. 2 is a schematic diagram of a detail of the arrangement of FIG. 1, explanatory of the operation of the integrated memory circuit of the portable device.
Figure 3:
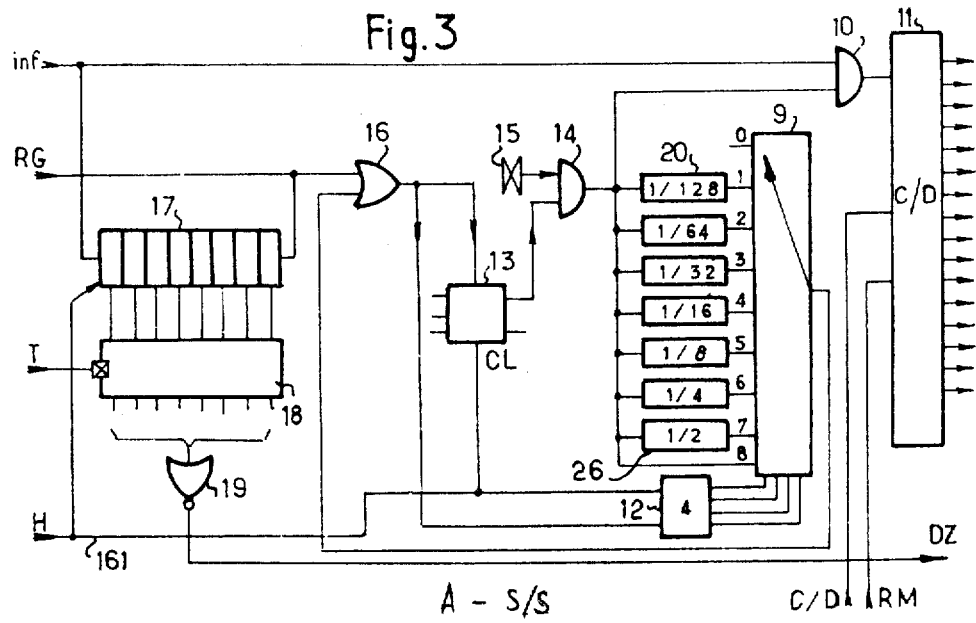
FIG. 3 is a schematic diagram of an add/subtract unit which is one of the elements illustrated in FIG. 1.

The different operating sequences of the arrangement, which are performed by the arrangements to be described below, are as follows:

supply of the ring;

setting up the general control path for the different elements of the arrangment by initiation of the switch 38;

operation of one of three memories (FIG. 2.);

operation of one of the two sequential adder/subtractors; (notes a - s/s) (FIG. 3);

reading the previous credits;

reading the new credit;

reading the previous debits;

reading the new debits.

The note dispensing device includes a power oscillator 150 which feeds a winding 151. When the ring is fitted to the dispenser, the primary winding 151 is coupled to a secondary winding 105 which forms a part of the circuits in the ring; this winding thus provides, by way of a rectifier device comprising a diode 106 and a non-capacitive electronic filter 107, a direct voltage for the different supply circuits of the ring. Possibly, this electro-magnetic coupling may be replaced by an optical coupling, the elements 150 and 151 being replaced by a light source, and the winding 105 by an electrovoltaic pile. The coupling of the ring and the distributor is effected simply by introducing a projecting portion forming a part of the ring into a corresponding receptacle provided on the distributor box. The effect of this introduction is to mechanically close a contact 27, which forms part of a general supply arrangement (not shown) for the circuits of the note distributor. Simultaneously, a delay device 28 is initiated which applied a level 1 to a first input of a OR gate 41; this 1 level is maintained during a time sufficient for the identification of a carrier of the ring to be effected normally; it should be noted that the second entry of the OR gate 41 which corresponds to the output of the trigger 42 is then set to nought by the operation of the trigger 42 produced by the appearance of a 1 level at its input CL by way of an OR gate 86. If this attempted identification is successful (it will be seen later in what conditions and how this is effected), the feed connection is maintained until the end of the operation of the distributor, thanks to the presence of a one level on the second input of the OR gate 41.

The absence of this signal, which denotes that the user has employed a false identification number, on the other hand, suppresses the power supply by the presence of a zero level at the two inputs of the OR gate 41, the level one on the first entrance falling back to zero and the level 1 on the second entrance not having been established so that the note distributor cannot be made use of. The practical construction of the note dispenser 28 is well known in the art and does not form a part of the present invention.

It should be noted that the arrangement here described is carried out using positive logic.

Setting up the General Control Channel

When a logic level 1 appears at one of the two inputs of the OR gate 41, it is transmitted through this gate to the AND gate 34 and, in parallel, to a rising monostable trigger 35; the rising monostable trigger 35, the stable state of which is indicated with respect to each of the two inputs by 1 and 0, sends an impulse of complementary value (1 on the output marked 0 and 0 on the output marked 1) in response to the appearance of a rising edge at its input; for the duration of the impulse emitted by the monostable trigger 35, the output marked 1 transmits a 0 logic level to a second input of the AND gate 34 which thus remains closed; the second output of the rising monostable trigger 35 sends a positive impulse to the reset input of counter 36, which controls the stepping circuit 38, at the end of the impulse emitted by the rising mono-stable trigger 35, the stable state 1 appears at the output marked 1 of this latter, which has the effect of opening the AND GATE 34. This then allows the passage of a first impulse provided by a clock oscillator 33; this impulse, transmitted to counter 36, causes the stepping circuit 38 to move to its first position, the output position marked 0 corresponding to the conductor marked t and numbered 160; it is transmitted simultaneously to the input of the descending mono-stable trigger 36, which functions simultaneously to the ascending mono-stable trigger 35, with the only difference that it yields an output impulse only for a descending edge as its input; this impulse, positive at the output marked 0 of the device 37, is transmitted by way of the stepping switch 38 to the output marked 0; after this impulse, this part of the apparatus remains inactive until the appearance of the subsequent impulse emitted by the clock oscillator 33 and the cycle repeats, identically to the previous cycle, the counter 36 causing the stepping switch 38 to pass from the output marked 0 to the output marked 1, the said following impulse emitted by the oscillator 33 being transmitted with delay and after being re-shaped by the descending monostable trigger 37, to the output marked 1 (general reset RG marked 161) of the stepping switch 38; the operating cycle is thus described successively for the ten output states of the stepping switch 38, the eight latter outputs all transmitting a positive impulse to the same conductor of the general clock (162) by way of the OR GATE 39; it should be noted that the outputs state marked 9 of the stepping switch 38 is immediately followed, in the cyclic operation preceding at described, by the output state mark 0; that is by that part of the arrangement which effect the control of the system during the whole of its operating time, as will be seen below.

In addition to the supply to the ring circuits, the transmission of data between the ring and the distributor is effected in both directions by optical coupling between light-emissive diodes and photo diodes.

Reading the confidential identification number

After the appearance of a positive impulse at the 0 output of the rising mono-stable trigger 35, a logic level 1 is transmitted by way of the OR GATE 60 and the optical coupling 45 to the memory reset input, which sets it to the first page of credit memory 50 and of debit memory 51, to initiate the subsequent process of reading (by 'page' there is to be understood an assembly of several memory stages in parallel, each of them corresponding to a non-conductive or conductive state, according to whether it has been written or not in an irreversible manner). This logic signal also sets to the same zero state of count the sequential adder/subtractors 32 and 49 and resets the counter 47 to zero; as to the memory 40, it is permanently set to the first page by a constant 1 level on its memory reset input (a level denoted by a plus sign in FIG. 1), for it contains only a single page which in principle and preliminarily is written for the duration of the life of the ring, which memory contains the confidential identification number of its bearer, written at the time when the account is created. It should be noted that the confidential code is devised in a nonrepresentative manner, and that it denotes the carrier of the ring as well as his bank.

The memory 40 in the ring (FIG. 2) is permanently in the read condition owing to the presence of a zero level at its read-write input, which employs the closure of the mechanical contact 3 and the inhibition of the latches 2, the eight-bit counter 1 followed by the latches 2 serves to address the memory 5 (a single address here, which is that of the first page; for the credit and debit memories, the passage from one page to the other is made at the beginning of each clock cycle by an impulse at the input RG (161), an impulse delayed by the descending mono-stable trigger 88 which causes the address counter 1 to advance one step; the first impulse which appears on the conductor 16 resets the four-bit counter 6 controlling the output stepping switch 4 and causes the counter 1 to advance one step, after having been delayed by the descending mono-stable trigger 88. In accordance with their order of arrival, the clock impulses detect in the selected page of the memory module the value of the different bit present at the output considered, from the bit of greatest weight to the bit of least weight, which are transmitted in sequence through the coupling 104 to the add-subtract circuit 32 which determine by binary parallel counting a number $x$ which is sent to the input of a comparator 30; at the other input of the comparator 30 there is already in the same form a number $y$, which has been transcoded in a manner not shown starting from the identification number previously composed on the decimal keyboard 31 by the carrier of the ring, in case of equality of $x$ and $y$, the comparator 30 sends by way of the AND GATE 85 a 1 level to the preset input of the bistable trigger 42, which changes state, applying a logical 1 level from its output to the input of the OR GATE 41, which assures the continuous operation of the clock 33 after the delay circuit 28 has ceased to operate. The presence of the AND GATE 85 requires the carrier of the ring to compose his confidential code within a predetermined delay period, corresponding to the delay time of the delay circuit 28.

Operation of sequential add/subtract identification circuit 32 (FIG. 3):

In this particular case the element 32 operates solely as an adder; it is maintained in the positive counting condition by the presence of a 1 level permanently at the up-down counting input marked c/d, symbolised by a plus sign in FIG. 1. It comprises essentially a sixteen-bit up-down counter 11 (of which only the eight least significant bits are employed here) to which are directed, in the presence of a positive information bit at the input of the AND GATE 10 originating from a memory 40, impulses originating from the oscillator 15 by way of the AND GATE 14. The general reset signal arising on conductor 161 closes the AND GATE 14 by way of the OR GATE 16 and the bistable 13 and resets the four-bit counter 12 to zero, which sets the stepping switch 9 to its off condition marked 0; the first clock impulse causes the switch 9 to advance one step, causing it to pass to its 1 input, by operating on the counter 12, and causes the element 13 to change state, which surpresses the inhibiting input at the input of the AND GATE 14, which allows the passage of impulses from the oscillator 15, which is three hundred times more rapid than oscillator 33; before the second clock impulse, 128 impulses from the oscillator 15, are in the present case, introduced by way of the AND GATE 10 into the sixteen-bit up-down counter 11; at the end of the 128 impulses, the frequency divider 20 sends a logic level 1 to the input marked 1 of the switch 9, which inhibits the AND GATE 14 by causing the trigger 13 to change state by way of the AND GATE 16; the system remains inactive until the appearance of the second clock impulse which places the switch 9 into its input state 2 and the preceding cycle is repeated; the following information arriving at the gate 10 corresponds to the reading of the value of the bit of weight immediately lower than that of the bit of greatest weight (second bit on the first page of the memory 40); the confidential identification number is thus read, translated into a number of impulses equal to its value, written in binary code in a stable manner into the device 11 and transmitted in parallel to the x input of the comparator 30 (see FIG. 1). The delay register 17, having series input and parallel output (FIG. 3), followed by latches 18 and by the OR GATE 19, provides a one logic level at the end of an empty page, that is to say, of which all the bits contain the information 0, nothing having been written therein. This zero detector arrangement, mark DZ, is not utilised here; on the contrary, it is in the adder/subtractor 49, as will be seen below.

Reading previous credit (see FIG. 1)

After a logic level 1 appears at the output of the comparator 30, it is transmitted by way of AND GATE 85 (the delay circuit 28 being theoretically not yet stoped), which corresponds to the preset input PR of the bistable trigger 42; the output of this latter trigger, passing from 0 level to 1 level, maintains the operation of the general clock until the end of the operations of the whole distributor; this level 1 is transmitted to one input of the AND GATE 87, thus keeping it open until the end of the operation of the device, the devices 50, 51, 49, 47 and subsequently 46 and 48 have already been reset to zero as has been seen above; at the beginning of the general clock cycle following the cycle of identification of the carrier of the ring, the information contained in the credit memory 50 are introduced into the sequential adder/subtractor 49 through the intermediatory of the output S of the memory 50 and the coupling 119, according to a method identical with that of reading the confidential identification number during the first clock cycle; the passage from one page of the memory 50 to the following page is effected, at the level of the memory 50, by an impulse provided at the beginning of the subsequent clock cycle on the conductor RG 161 by way of the coupling 44; the sum of the values of all the previous credits introduced into the credit memory in the manner described below, appears in a stable manner at the output of the sequential adder/subtractor 49, in binary forms; it is displayed on a display device 69 after transcoded (not shown), this type of operation being well known in the art. The same remark relating to the inverse transformation is also true as regards the keyboard of the decimal counting system 31 and 63; it is to be noted that during the operation of reading the credit the sequential adder/subtractor 49 is in fact in a counting condition, owing to the presence of a 1 logic level at its input by way of the output marked 0 of the switch 48 and the AND GATE 52; after the arrival of the value contained in this last written page of the memory, the page which is read on the following clock cycle is an empty page, which is detected in the sequential adder/ subtractor 49 by the presence of a 1 logic level appearing at the detector output marked Dz by way of the delay register 17 with series input and parallel output (FIG. 3), and the eight latches 18 operated at the beginning of the second clock cycle by the T output and the NOR gate 19. This 1 level inhibits the clock impulse RG 161 by way of the output marked 0 of the rising monostable Figure 81 (FIG. 1) and the AND gate 82 so as to retain the address in the memory 50 and permit the writing of a possible new credit required by the carrier of the ring on that empty page.

Writing of new credit

The same 1 logic level indicating zero detection, passing through the OR gate 108 causes the counter 47 to advance one step, and in consequence sets the switch 46 to its input position marked 1 and the switch 48 to its output position marked 1, which keeps the adder/subtractor 49 in the condition of positive counting owing to the presence of a 1 logic level on the other input of the OR gate 52; this same 1 logic level is transmitted by way of the coupling 57 to the read/write input of the credit memory 50, which places this latter in the writing condition by supressing addressing at the level of the latches 2, opening of the mechanical contact 3 and opening of the AND gate 7. The entry of the information in the serial mode into the page in which it is to be written is then effected by way of the switch 113 (FIG. 1) both the control of the credit memory by way of the coupling 120 and also that of the sequential adder/subtractor 49 by way of the switch 46 being effected while the switch 113 is controlled by the counter 115, which in turn is driven by the general clock; the value of the amount to be credited is then written into the first empty page in the credit memory 50 and added to the sum preceedingly displayed on the display device 69 by way of the 16-bit up-down counter of the sequential adder/subtractor 49. The end of the written page is detected by the AND gate 59 the two inputs of which are both at a logic level 1 at this moment the first input being the output marked 1 of the switch 58, the second being the output of the output of greatest weight of the counter 115 by way of the descending monostabled figure 150, the exact purpose of which is to detect the passage of the counter 115 from state number 7 to state number 0 when reading and writing the new credit into the memory 50 is terminated, the corresponding value is erased in a manner not shown by the reading of the credit register 114 by the appearance at its input E of a logic level 1 transmitted by the conductor 93. The output of the AND gate 59, taken to logic level 1, then resets to zero the credit and debit memories by way of the OR gate 60 and the coupling 45 and, by way of the OR gate 108, causing counter 47 to advance one step.

Reading of former debits

The new position of the counter 47 sets the switch 46 into its input 2 state (reading the memory debit 151), establishes the output 2 of the decoder 48 in the logic state 1, the 0, 1 and 3 outputs of this latter being at the logic level 0, which puts the sequential adder/subtractor 49 in a condition of counting down by the presence of a 0 level at its C/C input; the reading of the previous debits is then effected similarly to the operation effected previously on the credit memory 50, by way of the coupling 122, the number representing the sum of these debits being subtracted from the number already written in binary representation into the 16-bit up-down counter of the sequential adder/subtractor 49, that is to say subtracted from the number preceedingly displayed in the display means 69. The first blank page of the debit memory is detected by the AND gate 109 by the presence at the Dz output of the sequential adder/subtractor 49 of a logic level 1; it should be noted that at the moment when this information appears, the outputs of the sequential adder/subtractor 49 are in a numerical state representing in stable binary notation, corresponding to the operation X = (sum of previous credits) + (new credit) − (sum of previous debits)

this value X being necessarily positive, even in the case where the new credit is zero; on the assumption of a previous nil balance and the writing-in of a new nil credit, the value X will obviously also be nil, which consitutes one limiting case.

The value of the amount intended to be finally debited by the note-dispenser, set up before the introduction of the ring into the dispenser by its bearer on the keyboard 63 in decimal notation, is compared in its binary form Y with the X by the binary comparator 110; at the moment when the logic level 1 appears at the output 3 of decoder 48, this occuring when the last figure of counter 47 is set by the arrival at the output of the gate 109 of a logic level 1, by way of gate 108, the comparison of X and Y creates a new logic level equal to 1 on the single output of the comparator 110 if and only if X is greater than Y; at this moment the counter 115 which controls the successive input states of switch 116 having been reset to zero at the moment when the counter 47 entered its last state, the distributor is in a condition to write in the new debit.

Writing-in of new debit

In practice, the switch 46 being in its 3 input condition, is connected with the debit memory 51 by way of the coupling 124 to write-in a new debit of which the amount is simultaneously deducted in the same manner as above by the sequential adder/subtractor 49 in stable binary notation and subtracted in the display device 69. It should be noted that the rising monostable trigger 81 plays the same part for the debit memory 51 as it played for the credit memory 50, that is to say that writing into the memory is effected always on the first empty page detected and not on that following, which is also a blank page. On the other hand, the output 3 of decoder 48 being at logic level 1 sets the debit memory 51 in a writing condition during this last stage of operation of the apparatus, by way of the coupling 123, at the end of this phase a general stop command is produced by tripping of the trigger circuit 42 by the presence of a 1 logic level at its clear input CL by way of the OR gate 86, following upon release of the AND gate 111, which itself was made conductive by the presence at its input of a positive impulse arising at the nought output of decending monostable 140, acting in the same manner as at the end of writing a new credit into the memory 50. The operation of delivering the bank-notes (not shown), occurs at the same time as this writing-in of the new debit into the debit memory 51, in accordance with the sum of which the amount has been previously written in decimal notation by the carrier of the ring, by the use of the keyboard 63, and tested as we have previously seen.

The manner of transformer coupling for feeding the ring from the co-operating apparatus has been chosen and represented in FIG. 1 in a manner ensuring electrical isolation; the secondary 105 of the transformer constituted by the windings 151 and 105 during their cooperation is followed by a filter 107 supplying at its output a stabilized direct supply voltage, a non-capacitive filter is preferred for miniaturization, the capacity necessary for a normal filter cannot be made sufficiently small with respect to other electronic elements; this supply coupling may also be effected by optical coupling between a luminous source contained in the co-operating apparatus and a photovoltaic pile contained in the portable device, thus again desired electrical isolation so as to avoid all risk of short circuit destroying the memories contained in the ring, for the same reason as the other optical couplings which have been chosen for the circulation of logic levels between the co-operating apparatus and the ring. The three memories of which the operation have been described are in principal of the same type; of the integrated circuit type, they have the property of being susceptible to writing upon demand, in a progressive and irreversible manner (except for certain type of memories which can be erased in a non-accidental fashion but by appropriate treatment); these memories, in addition to the fact that their capacity is some 1,000 times higher per unit surface to those of magnetic memories generally employed for this type of application, present the advantage with respect to these latter of a higher facility and flexibility of reading and writing owing to the fact that they do not require the immediate proximity of the reading device; their addressing being carried out electronically, the expensive, sophisticated and unreliable electro-mechanical devices are thus replaced by simple conductors of which the number may also be reduced by the procedure known as multiplexing. Among this family of integrated circuit memories, non-volatile memories are preferably employed.

The display device 69 provides simple visualization by the appearance of luminous numbers, but it may be also replaced by a print-out, this print-out could also have its inputs connected in parallel, which would allow the carrier of the ring to retain a written trace of the reading operations effected by the co-operating apparatus in the course of the operation described above.

The above procedure, specifically described with reference to the distribution of bank-notes may also be conveniently applied directly at a point sale, which allows the ring-bearer to make purchases, the amount of the purchase being transferred neither by cash nor by cheque but simply by the fact that the purchasers ring is debited with the required amounts.

Figure 4:
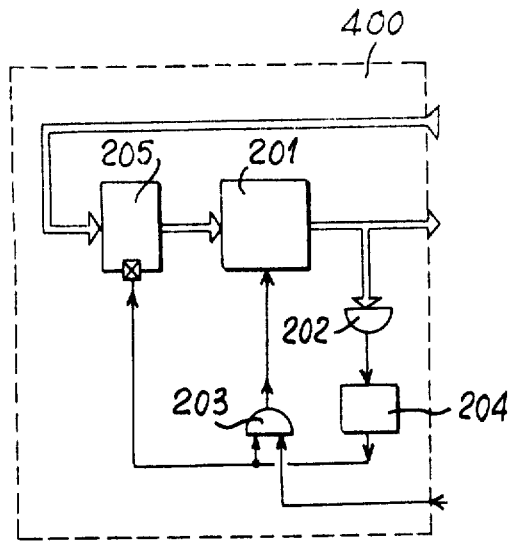
FIG. 4 is a diagram illustrating a first form of inhibitor means preventing any modification of the sections of the portable memory already programmed.

FIG. 4 shows one form of construction of a detector for unprogrammed sections of the memory, in the case where the detector is contained within the card 400. This embodiment operates a memory 201, the addressing of which is controlled by a lock 205. The N gate 202 constitutes a blank-address detector, which operates the memory 205. This controls at the same time the writing gate 203 and the lock 205.

Figure 5:
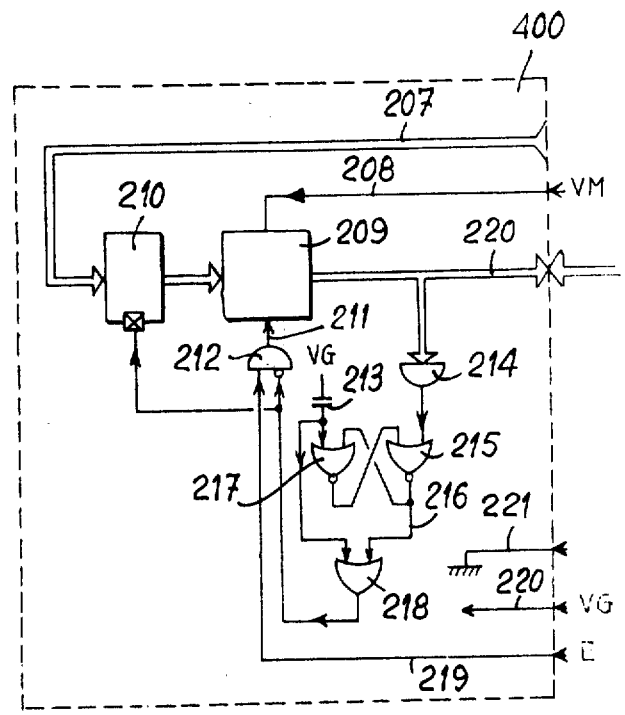
FIG. 5 is a modified embodiment of inhibiting means for an already written section.

FIG. 5 shows another embodiment of un-programmed memory sections, in the case where the latter is contained in a card 400.

Figure 6:
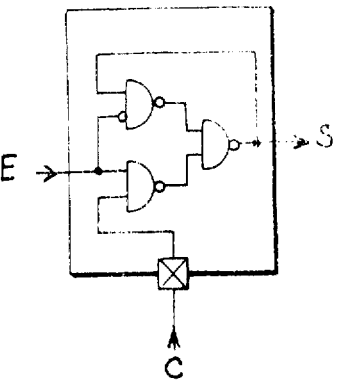
FIG. 6 shows a detail of a single channel inhibiting gate.

The memory 209, arranged in $m$ words of $n$ bits (for example 256 words of 8 bits) is externally addressed by the conductor bundle 207 (eight conductors in the chosen example) by way of the element 210 (eight latches); (see FIG. 6 for details of the construction of a latch; E, F, C denote respectively the input, the output and the charging control). In the empty state all the positions in the memory of this device are at the logic level 1. It may be an integrated circuit of the type 1702 (Intel), 5203 or 5204 (National Semi Conductor) or 7620 (Harris Semi Conductor) for example.

The output of this memory is constituted by the bundle 222 of conductors (here 8 conductors,) directed to the exterior.

The inhibiting input 221 allows, when it is taken to logic level 1, the writing operations initiated by the raising of the supply voltage of the memory and the connection to an appropriate level of the output bit intended to be written.

When voltage is applied, the R - S trigger constituted by gates 217 and 215 is automatically set to level 1 (conductor 216) owing to the capacitor 213 connected to the positive terminal of the supply. The same capacitor, by way of the OR gate 218, produces a brief moment of conduction in the latch 210 and the inhibiting of the writing gate 212.

If the address indicated at this moment by the conductor 207 is empty (8 wires of output 222 at logic level 1), the presence of a one level at the output of the 8-input AND gate 214, forces the R – S trigger to the nought level at the end of the impulse provided by the capacitor 213.

Thus a definite consequence of the supply of voltage to the portable circuit is the blocking of the element 210 and the opening of the gate 212, allowing writing at this address by the conductor 219.

This state is stable, until the next time voltage is applied, that is to say that no other change of address if possible, since only a single impulse is provided by the capacitor 213.

If the address set up when the voltage is applied is already occupied (presence of a single zero on the conductor 222) the presence of a zero level at the output and a AND gate 214 will be without effect on the trigger R – S, which as a result is set to level 1 by the capacitor 213. The presence of a 1 level at the output of the OR gate 218 will thus prohibit writing. Addressing will however be possible, authorising the reading of all the occupied addresses in the memory.

The first blank address called up will cause the R–S trigger to change into the 0 state, authorising lighting and prohibiting addressing until the next time voltage is applied.

If the user desires to write in two successive addresses, it is essential to remove the supply from the arrangement, and then put it in service again.

The arrangement thus devised may readily be carried out in the form of integrated circuits and fixed to a support such as a card (8 × 5 cm in size, for example) carrying its 20 access connections, as follows:
 eight address wires
 eight data output wires
 three supply wires (VG general supply to peripheral circuits, VM memory supply, earth),
 one writing command wire.
in a non-integrated form the apparatus may be constituted by a six separate integrated circuits and one capacitor, assembled on a printed circuit establishing the necessary connections and serving for mechanical supports.

Supply to the portable circuit is effected by conductors 208, 220, 221.

The apparatus (the transfer arrangement), arranged to exchange data with such a card is represented in a synoptic manner in FIG. 7, which will now be described.

In the writing phase supply is effected over the conductors VG240 and earth 328, as well as by the conductor VM208.

The received data conducted over the leads 224 to the processing device possibly possible taking into account their respective addresses (sent over the conductors 252 connected in parallel with 222) are compared with the possible external data provided over the conductor 248, the result of the processing effected giving rise to the operations of writing 246 (conductors 254, 256, 226) of recording 250, of display 251 and/or of publication 253, as well as verification 258.

The writing device 246 serves to coordinate the different operations necessary for writing: raising of the voltage VM (special source of supply for the programmable memory 209) to the level VP, level 1 on the conductor 226 marked E, disconnection of the conductors 224 and the connection of an appropriate level to the wire intended to be written.

Figure 8:
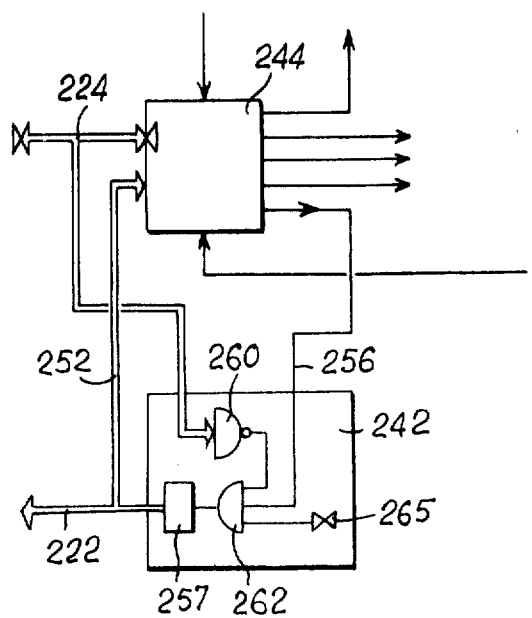
FIG. 8 is a detail of the addressing circuits of the device shown in FIG. 7.

The addressing device 242 advantageously comprises a modulo-n binary counter 257 capable of addressing successive addresses in the memory, and thus of always allowing writing in the first empty address available, owing to the presence of the NAND gate 260, of the 3-input AND gate 262 and of the clock 265 (FIG. 8).

The NAND gate 260 serves to indicate to the processing device 244 that the address activated at that moment is empty. This gate 260 may be inhibited by providing an automatic zero-resetting of the counter 257 during the time when voltage is applied to the cooperating apparatus.

In the case of a memory of 16 kilobits (1356 pages of 12 bits), 27 connecting points in all are necessary for the circuit, which may appear prohibitive. To reduce the number of connections, input and output multiplexing may be effected, and/or a basic memory may be used which is organised into words of one bit, such as that which will now be described with reference to FIG. 9, which represents a memory module organised in mn words of one bit devised around a primary memory organised in $m$ words of $n$ bits, $n$ being the preferred word format. This module includes the different multiplexing circuits necessary, but also writing circuits permitting entry in a selective bit (one of the 8 bits of one of the pages among 256) by simple logical commands at a single writing input.

Writing into such a programmable memory is generally effected in several steps. An axample of the cycle is as follows:
1. addressing of selective word
2. disconnection of the memory output stages
3. raising the memory supply voltage to the correct value
4. connection to a predetermined voltage of the bit intended to be written (replacement of the initial state by the 0 state). This often corresponds to an open collector output of the memory This collection of operations must often be effected taking into account certain time constants.

The memory 102 properly so called (for example of Harris type 7620) is connected to its memory resistors 338 to 345, as well as to 8 NAND gates which are highpower types of the open collector type (304 to 311).

One of the inputs of each of these eight gates is connected to point D of the memory (control of disconnection of the output stages).

The supply input of the memory, to which are connected all the memory resistors, if connected to the output 352 of an electronic switch. This is composed of transistors 334 and 336, together with an inverter 347. In the presence of logic level 0 on the conductor 350, the transistor 336 is cut off, while the inverter 347 activates the transistor 334, establishing the connection of point 352 with the general supply VG. On the contrary, in the presence of a 1 level, it is the writing supply VP which is connected to the point 352.

The timing device 126 as well as the element 348 and 303 serves to assure the proper timing of the successive commands corresponding to the writing operation. The latch 332 serves to freeze the address (by a zero level, created by the inverter 328), at its blocking input 356 during a writing operation.

Eleven weights of address are necessary in the case when a 256 × 8 bits memory is used in the form of a 2048 × 1 bit memory. The eight most significant bits will address the memory properly so called (pages); the three least significant bits control the reading switch 322 and the writing switch 320.

If an 11-bit address is chosen, a positive writing command on the conductor 330 locks the device 332, while the following commands are given in succession;
   the disconnection of the memory (conductor 360)
   the raising of the supply voltage (conductor 350)
   connection to earth of the second input of the NAND gate 304 to 311 selected by the conductor 326 chosen by the setting of the switch 320.

The addressing operation is the same for reading, by way of the switch 322, controlling the output conductor 336.

The high-input threshold inverters 312 to 319 serve to isolate the switch 322 and the NI gate 324 during the writing phase.

The 8-input NI gate 324 detects in the form of a one level on conductor 370, an 8-bit page entirely empties.

Thus constructed, the module may schematically represented in the manner shown in FIG. 10. It includes 17 access connections:
   11 weights of address ($A_0 - A_{10}$)
   3 supply points VP - VG - earth
   2 outputs: S (bit) and AV (indication of empty page)
   1 writing command E.

Figure 11:
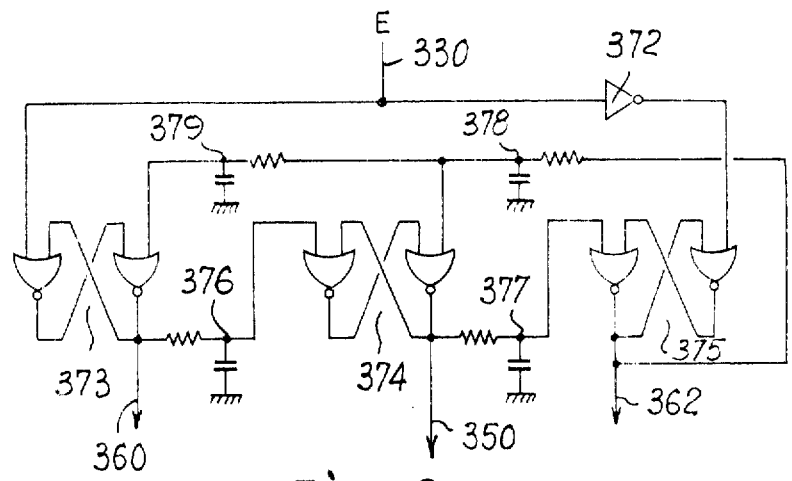
FIG. 11 shows a form of construction of the clock circuit for the memory module described with reference to FIG. 9.

An exemplary embodiment of the timing circuit 326 is represented in FIG. 11. It consists essentially of three R - S flip-flops 373, 374 and 375, actuated successively by four delay lines 376, 377, 378 and 379. The inverter 372 gives the order to terminate writing.

A simple modification of the circuitry would allow the module to be equipped with any type of memory what ever: live, inert, programmable, or programmable/reprogrammable. These modifications will be clear to those skilled in the art.

Figure 12:
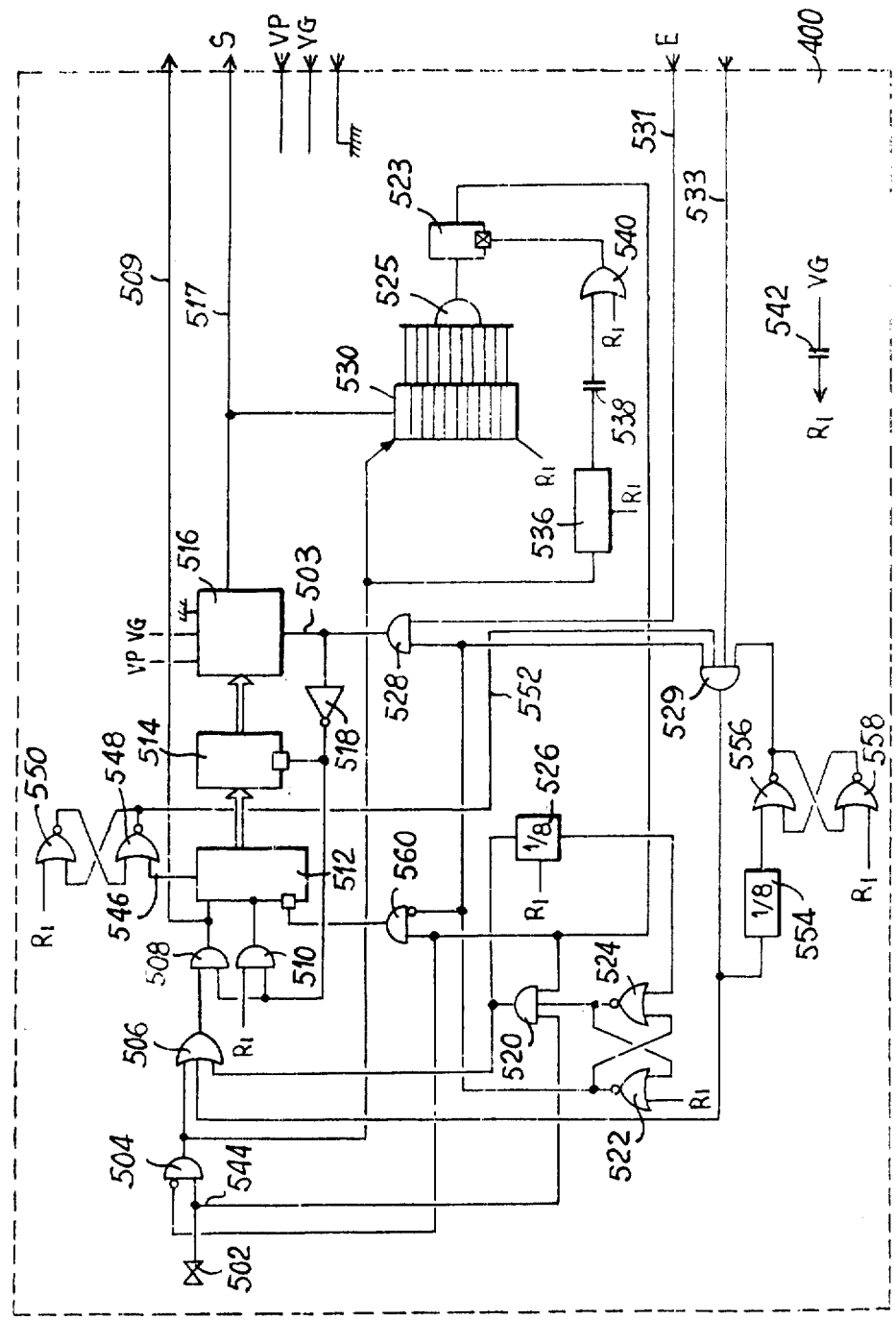
FIG. 12 shows a form of construction of the inhibing means for the case where the memory is organised in $mn$ words of 1 bit.

FIG. 12 represents another embodiment of inhibitor means (for detecting the unprogrammed sections) in the case where the memory is organised in mn words of one bit (for example 2048 words of one bit). In the case where this modification of the detector is contained in a card 400, the element 516 is a module including, in addition to the memory properly so called, the different circuits necessary for the writing operation; these circuits are activated by a unique positive command applied over the conductor 503.

By way of the up-down counter 512 the clock 502 sets the latch 514 and the gate 504-506-508 to the different addresses in the memory. The shifting register 530 converts the eight information bits emerging successively from the memory into the parallel modes. A "divide by eight" 536 provides, for every eight clock pulses, a command to examine the contents of the register 530. This order is transmitted by way of the capacitor 538 and the OR gate 540 to latch 523 connected to the output of the AND gate and to the eight inputs 524. In the case where the output of this gate is at level O (page occupied), the addressing will continue. If the output of the latch 523 is at level 1 (page entirely empty), the inverted input of the AND gate 504 interrupts the arrival of the clock pulses, places the up down counter 512 in a count-down condition and opens the AND gate 520, which, in turn, allows pulses originating in the clock 502 to pass to the gate 506.

The up-down counter then returns following the eight impulse of this sequence (detected by the divide by eight circuit 526) which, causing the R - S trigger constituted by the NI gates 522 and 524 to change state, closes the gate 520, which puts the clock 502 out of action.

Thus the memory is set to the first empty address following a written page. Writing is then authorised, by the gates 528 and 529 which, respectively, allow the transmission of the writing command fed from without by way of the conductor 531, and the addressing of each bit in turn from without by conductor 533 by way of the gates 506 and 508. The gates 508 and 510 as well as the inverter 518 serve to latch the address and to freeze the state of the address counter during the writing impulse.

The capacitor 542 allows the development of a single reset impulse for all the sequential elements of the device, at the moment when voltage is applied to it.

The R-S trigger 548-550 is definitely reset to zero by the passage of the up-down counter 512 into the maximum count position CM (conductor 546) establishing a stable 0 level on the conductor 552, which has the effect of closing the address gate 529.

This arrangement prevents a would-be fraudulent operator from being able to return to an occupied address, by using in addition to the nominal capacity of the counter, the bit by bit address input 533.

Thus arranged, the apparatus provides on the conductor 517, when voltage is applied to the apparatus, the whole of the information which it contains in the memory, then sets itself to the first address on the first empty page, in a position for necessarily writing upwards owing to the gate 560 of which the inverted entry forces to zero the up/down command for the counter at the end of the train of eight decending impulses.

The synchronizing impulses are transmitted to external apparatus by way of the conductor 509.

It will be apparent that the clock 502 may also equally well be placed outside the apparatus. The conductor 509 could serve, in this case, to synchronize the module with regard to external apparatus, and could be connected to point 544.

For goood cooperation with external apparatus this card requires only six connecting points.

Possible verification of what has been written may be effected, at the end of the operation by brief interruption of the supply, reading of the new contents of the memory, and comparison with the old contents previously read and/or with the equally stored writing command.

The divide by eight circuit 554 as well as the flip-flop 556 - 558 allows the bit-by-bit address impulses to be limited to 8, in accordance with the writings. In the course of one energization of the portable circuit it is only possible to write on the first blank page (one work of 8 bits) in the memory 516.

Figure 13:
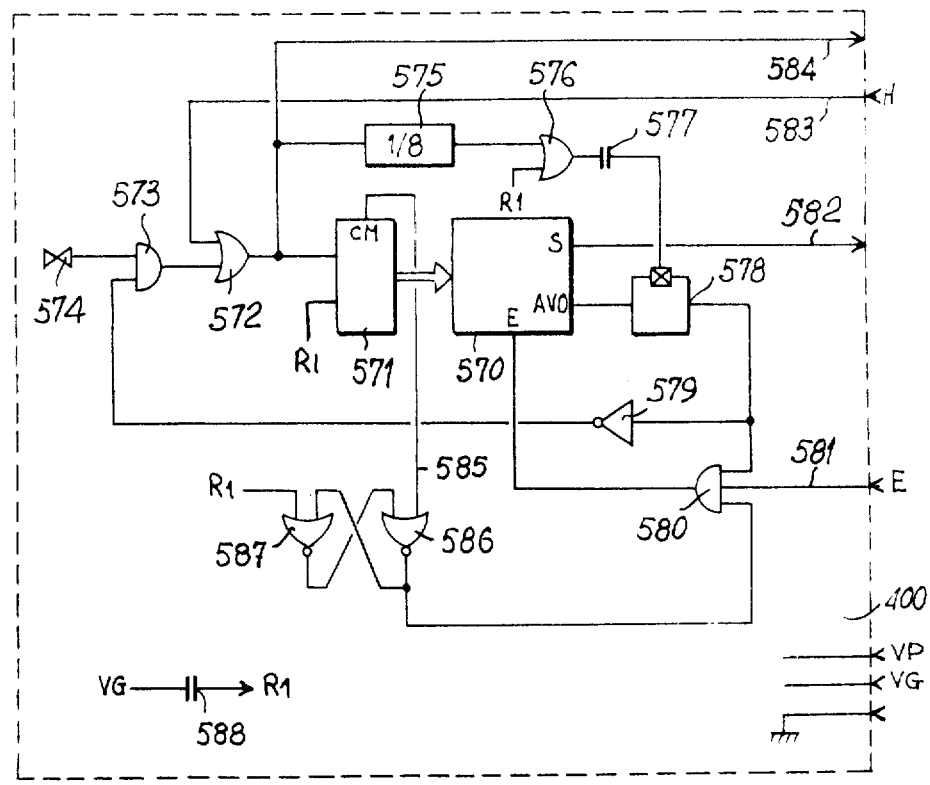
FIG. 13 shows another form of construction of the inhibitor means for the case where the memory module is of the kind described with reference to FIG. 9.

FIG. 13 which represents another embodiment of writing inhibitor means (for detecting the un-programmed sections) will now be described with reference to FIG. 13. This embodiment applies to the case where the memory module is of the type described with reference to FIG. 9. In the case of this embodiment, the detector circuits are situated on the card 400. The memory 570 which is used is organized in words of several bits, for example 256 × 8 bits; it includes its own multiplex circuits for writing and reading. A gate connected in parallel to its 8 outputs (see FIG. 9) allows an empty page to be detected (presence of a one level on all the inputs and in consequence at the output), but addressing is nevertheless effected by addresses of one bit.

The first page (first 8 bits) will necessarily be occupied (presence of at least one O bit.

When voltage is applied, the latch 578 locks at the zero level (first address occupied) thus by way of the inverter 579, opening the gate 573 which allows impulses originating in the clock 574 to pass.

The counter 571 then addresses the memory (in words of one bit) while the divide by 8 device 575 signals to the latch 578, by way of gate 576 and the capacitor 577, a change of page.

At the first empty page, a 1 level at the output of the latch will close the gate 573 and will open the writing gate 580. Addressing may then proceed bit-by-bit, controlled from outside, over the conductor 583 by way of the gate 572, while the writing impulses are likewise lead from outside by way of the conductor 581.

Information output takes place over conductor 528, while external synchronization is effected over conductor 584.

In the case where the memory has all its pages occupied, addressing will proceed indefinitely, thus informing the user of the state of the device.

The trigger 586 – 587, connected to the CM output 584 of counter 571 allows closing of the bit-by-bit address gate 580, at the nominal capacity of the counter.

Capacitor 588 provides on the conductor $R_1$ a single reset impulse for all the sequential elements in the portable circuit, at the moment when voltage is applied to it.

A card thus constructed may represent an advantageous embodiment for a semiconductor recorder.

Devised around memories of the programmable/reprogrammable type (electrical or optical eraser) it would allow, when connected to a cash register at a point of sale, for example, to record, in accordance with the time for which voltage is applied to the apparatus, words of 100 bits representing for example the number of the bank account of the purchaser (84 bits) and the amount of purchase (16 bits).

A card including for example 16 2048 bit memories would thus permit the recording of 327 purchases, representing for example 6 working days of a register working 9 hours per day, and recording a sale every 10 minutes.

Taken regularly to the bank for removal of the information, erasure and replacement by a bank card, this card could play the part of virtual connection between the means for collecting data (point of sale) and the treatment device (bank).

In another field of utilization (recording of alphanumeric data), this could record the equivalent of about 90 type written lines (for example an individual health certificate or even a passport, or an identity card).

Figures 14, 16:
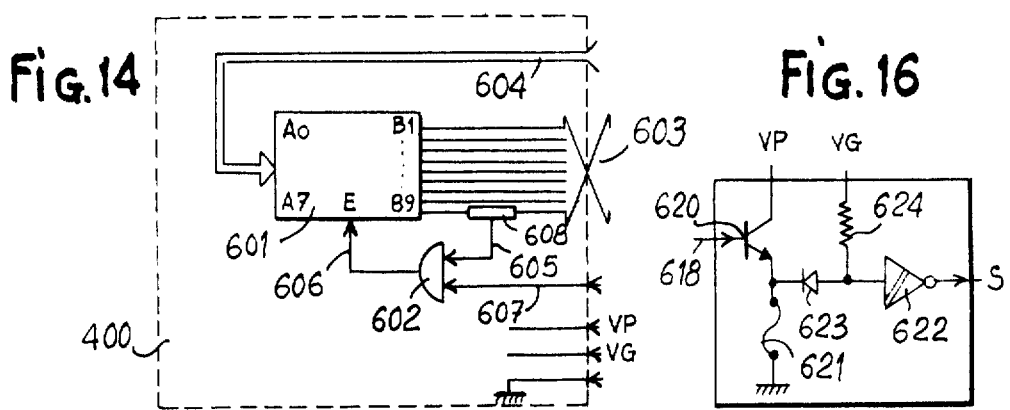
FIG. 14 shows a form of construction of the inhibitor means prohibiting the modification of what is written in sections coded as prohibited.
FIG. 16 shows a form of construction of an activating circuit arranged permanently to activate the inhibitor means.

FIG. 14 will now be described, which represents a form of construction of inhibitor means arranged to prohibit the modification of the contents of memory sections coded as prohibited. The inhibitor means are contained in a card 400.

The memory 601 is organized in words of 9 bits, for example 256 × 9 bits. In the empty state, the whole of these memory addresses are at the logic level 1. The number of the bank account, constituted for example by 21 digits, or 84 bits, is divided into 11 words of 8 bits each word being followed by a bit $B_9$ of logic value 0. The initial writing is effected from $B_1$ to $B_9$, for each of the 11 pages which are occupied by the bank account number, in such a manner that the destruction of the 9th bit prohibits writing only after this has been effected. The writing gate 602, which may possibily be able to receive a high voltage at its input 605, controls input 2 and disconnection - 606 - of the memory (often referred to in the technical literature, CS, E or ME). This latter is addressed by the bundle of conductor 604 (8 conductors in the present example), while the 9 input/output bits are available at point 603. The command is given over the conductor 607.

This arrangement presents the advantage of being able to make irreversible all the information addressed to 8 bits in the memory. It possesses, however, the inconvenience of requiring a large number of points of connection to the exterior (21 in the example referred to), as well as a diode arrangement 608 allowing the gate 602 always to be made conductive by an external command.

It is possible to reduce the number of these connections by using a memory organized in words of 1 bit, in a circuit such as that represented by FIG. 15 which will now be described.

Figure 15:
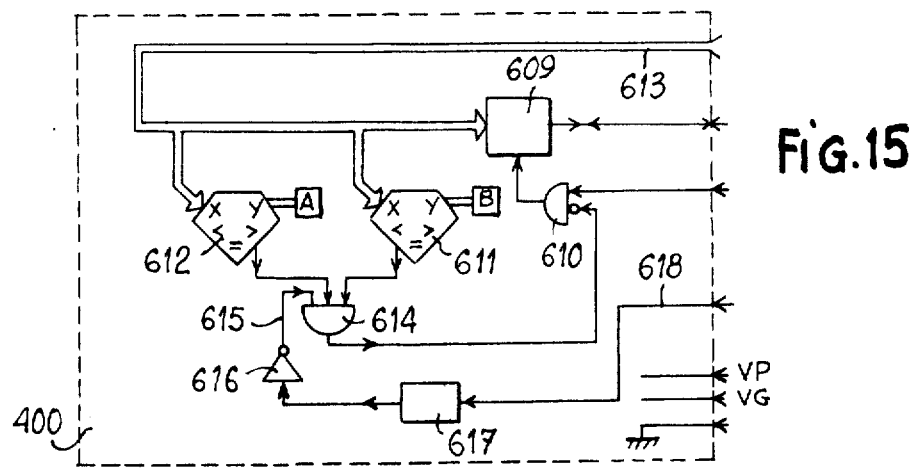
FIG. 15 shows a form of construction of the inhibitor means differing from the described with reference to FIG. 14.

FIG. 15 represents another manner of construction of the inhibitor means, arranged to prohibit the modification of the contents of sections of the memory which are coded as prohibited. The inhibitor means are contained in a card 400.

The address conductor 613 of the memory 609 (organized in 2048 words of 1 bit) likewise command the parallel 11-bit comparator 611 and 612, connected by their second inputs to two connecting networks by which they are connected to coding means A and B such as diode matrices, inert memories or simple connecting points, determining the prohibited numerical window (that is to say, the addresses of the sections which are coded as prohibited). The comparators authorize the opening of the gate 614; writing may therefore be prohibited, owing to the inverting input of gate 610 connected to the output of the gate 614.

It should be noted that if the address consituting the lower limit of the memory corresponds to the first address in the memory, the comparator 612 and the corresponding coding device may be eliminated.

However, in order to be able to ensure initial writing of the bank account number, it is necessary that the input 615 of the gate 614 shall be locked following the construction of the integrated circuit, then finally opened (logic level 1) after the initial data has been written in. This is made possible by the actuating circuit 615, externally controlled at point 618, at a unique time in the life of a card.

There will now be described, with reference to FIG. 16, a manner of construction of the activating circuit 617, capable of storing in a definite manner, for the life of the semi-conductor considered, an impulse of correct level and duration.

Such a circuit may be constituted by a transistor 620 connected in series with a fusable element 621. An inverter 622 constitutes the output of the element, at the point of connection of the transistor and the fusable elements. A diode 623 is nevertheless interposed, so as to, during the operation of destroying the fusable link (which is generally effected by means of an impulse of value VP higher than the general supply VG for the circuits) to prevent current passing towards the inverter.

In addition, a resistance 624 is connected between the inverter and the positive pole of the VG supply: in this manner, the inverter input is always situated at earth potential (diode conductive) as long as the fusable element is intact, the inverter output being in consequence at logic level 1.

When the fusible element is destroyed, the inverter input being connected to the positive pole of the supply, a 0 level is present at its output. Thus, before the order for destruction is given, a logic level 0 is present at the output of the inverter 616, authorizing writing. When this has been effected, a logic level 1 of sufficient duration on the control line 618 produces the final change of state of the element 617, in consequence unblocking the gate 614.

If it is desirable further to reduce the number of connecting points, it is indispensable to provide the card with addresses in the serial mode: either by a shifting register or by a counter. The counter presents the advantage of imposing on the apparatus an operation based on a succession of predetermined addresses (from address 0 to address 2047), which is not the case with a shifting register. In addition, its complexity is less than that of the shifting register; as a result, it is preferable to use a counter (asynchronous, increasing).

Figure 17:
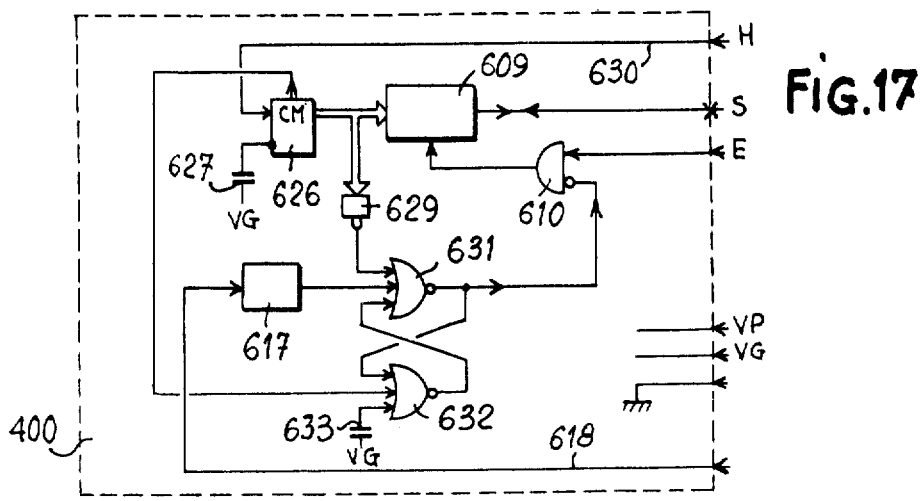
FIG. 17 shows a form of construction of the inhibitor means for the case where the memory is adressed by means of a computer.

FIG. 17 represents a manner of construction of inhibitor means intended to prohibit modification of the contents of the sections of the register coded as prohibited, in the case of a memory provided with a counter 626.

The inhibitor means are contained in the card 400.

This embodiment includes, in addition to the memory 9 organized in 2048 words of 1 bit (and the writing gate 610, a decoder gate circuit 629, unblocking capacitor 627 and 633, an R-S flip-flop constituted by NI gates 31 and 32 as well as an actuating circuit 617.

The decoder gate circuit 629 is coded to detect in the form of a high level at its output, the highest address y of the prohibited sections 0 - y (the address number 83 in the example considered), where the number of the bank account, comprising 21 digits — or 84 bits — occupies the first 84 addresses in the memory. When voltage is applied (element 617 being active), the output of the flip-flop sets itself in a stable manner to the logic level 1 state, because of the (single) impulse emitted by the capacitor 633; the output of the element 617 is at low level, as well as that of element 629, because of the automatic resetting to zero, commanded by the capacitor 627 of the counter 626.

Gate 610 is in consequence closed in a stable manner.

When 84 clock impulses have been received on the sequential address conductor 30, the output of decoder 629 is established at level 1 which forces the output of the flip-flop to zero, and in consequence opens the writing gate. the address shown 0.83 is therefore definitely restricted against writing in a general manner, because the maximum count output of the counter systematically resets the flip-flop at the moment when the counter obtains the address 0 on exceeding that capacity.

Initial writing is made possible by the fact that a one level is originally present on the output of the element 617, forcing the flip-flop to zero in the stable manner. After initial writing has been effected and verified a logic command 1 on conductor 618, retained for a duration sufficient with respect to the characteristics of the organ 617, allows the final liberation of the flip-flop, that is to say the definite irreversibility of the initial writing.

Figure 7:
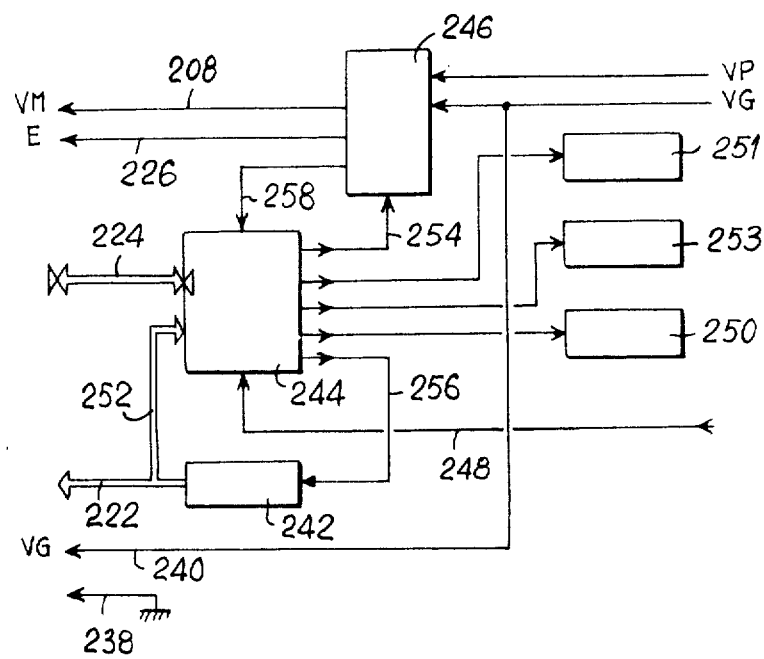
FIG. 7 is a synoptic chart showing the organisation of a transfer device capable of cooperating with a portable device comprising inhibiting means such as those described with reference to FIG. 5.

The embodiment represented in FIG. 7 may be especially made use of to provide a payment card including memory sections coded as prohibited and containing:

addresses 0 to 49 : the personal entitlement code
addresses 50 to 133 the bank account number
addresses 134 to 233 the name of the user
addresses 234 to 273 the serial number of the card.

In the example given, of a memory of 2048 bits, 1774 bits remain available to store the financial operations, for example such as:

amount of balance : 12 bits,
date : 16 bits
validity bit : 1.

Thus 61 operations of 29 bits are capable of being stored if the recording of the date is unnecessary and if 10 bits suffice to represent the amount of the balance; 161 operations of 11 bits may be recorded in the memory of the payment card.

Figure 18:
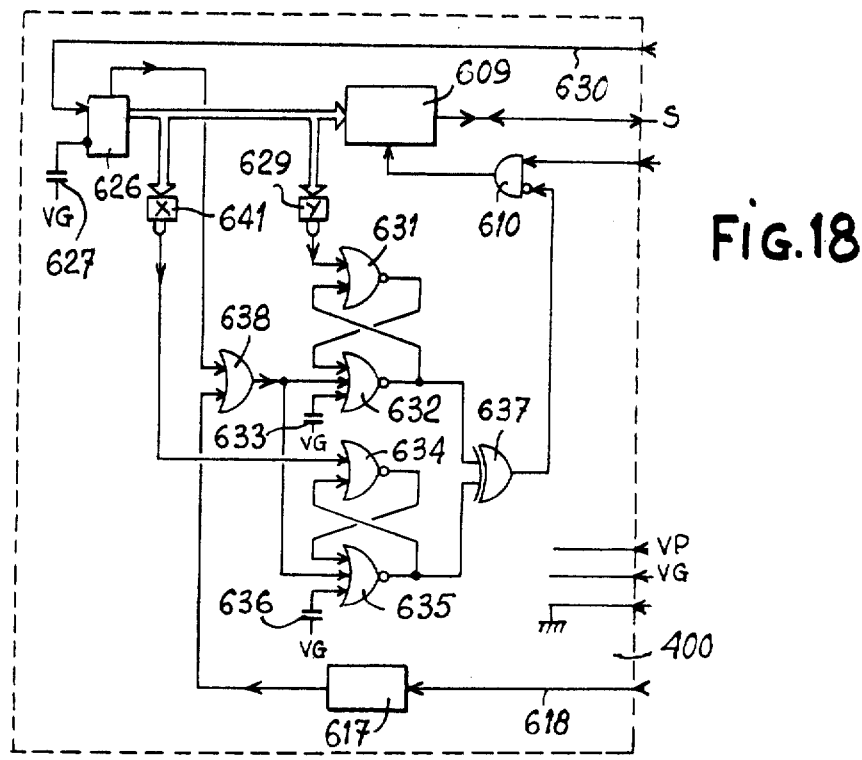
FIG. 18 shows a form of construction of the inhibitor means permitting the prohibition of the memory addresses between a lower limit X and an upper limit Y.

The modified diagram of FIG. 18, illustrates an embodiment allowing the lower boundary of the prohibited numerical window to be a value $x$ different from zero; for example: $0 < x < y < 2074$.

The arrangement already described with reference to preceding figures carry the same references.

This embodiment comprises a second address decoder 641, a second flip-flop 634 – 635 with its figure capacitor 636, a decoder 637, constituted by an exclusive OR gate and also an OR gate 638.

The decoder 637 in combination with the other decoder 641, 639 and the associated circuits defines the following sequential function:

$0 < A < x$ : writing possible
$x < A < y$ : writing prohibited
$y < A < 2047$ : writing possible (A being the address presented on the parallel output 9 of counter 262).

Figure 19:
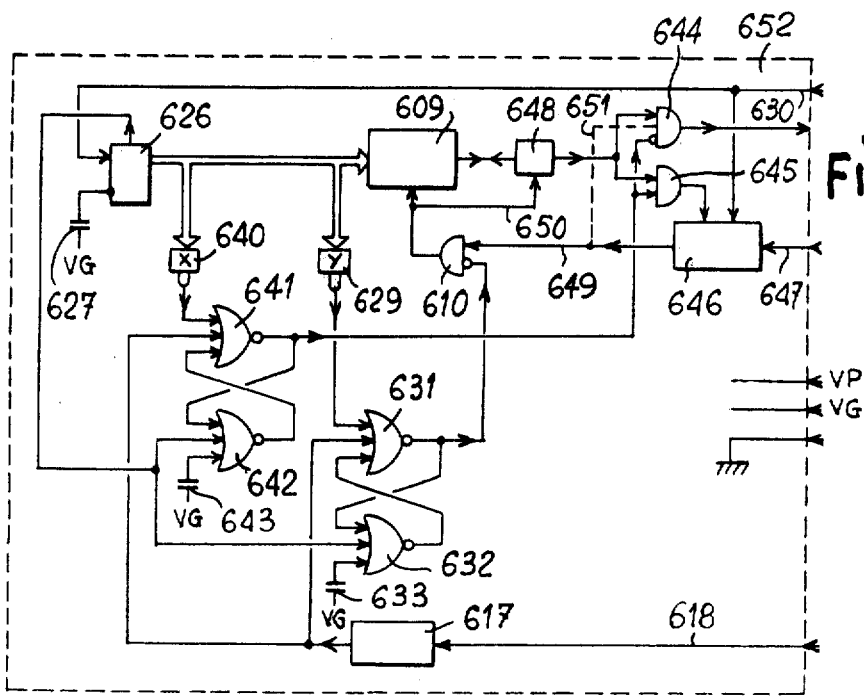
FIG. 19 shows a form of construction of the inhibitor means intended more particularly to prohibit the reading of certain sections of the memory.

FIG. 19 represents an embodiment of an inhibitor means particularly intended to prohibit the reading of the contents of certain sections (or zones) of the memory. The inhibitor means are situated in the card 400. The information contained in this zone are never taken from the card 400: they are intended to be employed in the interior of the card by a processing means such as 646. In the embodiment represented in the FIG. 19 the zones $O - x$ is prohibited from being read; the zone O $- y$ is prohibited from being written in.

The inhibitor means for the writing means have already been described with reference to FIG. 18; these means will therefore not be described again, they carry the same reference numerals.

The decoder 640, the flip-flop 641 – 642, the triggering capacitor 643 and the output gate 644 constitute the essential elements of the reading inhibitor means. While the gate 644 is closed, the information contained in the card memory cannot be withdrawn from the card and become accessible to reading means situated outside the card, especially in the associated apparatus.

The confidential information contained in the $O - x$ zone of the memory may for example be made use of to code — owing to special treatment means 646 — words intended to be written into the memory in the following manner: these words enter in their initial coding through the writing input 647 and emerge on the conductor 649 in the new coding defined by the word prohibited from being read. A commutator device 648 acted on by the entry of the writing command 650 allows the correct sequence of the correct electrical writing operations while isolating low-power circuits during the writing operating.

The activitating circuit 617, while it is in its initial state, permits writing in all sections of the memory.

What is claimed is:

1. A data storage system comprising at least one portable electronic device and at least one data-transfer device, characterized in that said portable electronic device comprises:

readily portable plural-section, addressable data memory means;

coupling means operable temporarily to connect said memory means with said data transfer means;

memory control circuits interconnected with the coupling means and with the memory means; said memory means and said control circuits being constructed in the form of logic microstructures; and in that said data transfer device comprises data transfer means operable to transfer data into said memory means;

said system being further characterized by inhibitor means preventing the transfer of data of predetermined sections of said memory means.

2. The invention claimed in claim 1 wherein said inhibitor means are disposed in said portable electronic device and are interconnected with the memory control circuits therein.

3. The invention claimed in claim 1 wherein said memory means comprises an inert, unpowered memory device.

4. The invention claimed in claim 3 wherein said inert memory device is a semiconductor memory device.

5. The invention claimed in claim 3 wherein said inert memory device is a programmable memory device.

6. The invention claimed in claim 3 wherein said inert memory device is a reprogrammable memory device.

7. The invention claimed in claim 1 wherein said memory means is incorporated in said portable electronic device in such a manner as to be inaccessible to the user.

8. A data storage system as claimed in claim 1 for collecting and storing in a single portable memory means data originating in distinct locations, wherein said transfer means comprises cyclically operating writing means for writing data into said memory means in said portable electronic device and wherein said memory means comprises a plurality of individually addressable storage positions each arranged to receive and store one data word.

9. The invention claimed in claim 8 wherein said inhibitor means comprises unprogrammed memory section detector means and means responsive to said detector means to prohibit the entry of data into already-programmed sections of said memory means and to allow the entry of new data into said unprogrammed sections of said memory means.

10. The invention claimed in claim 9 wherein said unprogrammed memory section detector means is situated in said data-transfer device, said detector means including a shifting register associated with latch means, said shifting register having an input coupled to receive the contents of a selected section of said memory means in the serial mode and said latch means having outputs providing said memory sections contents in the parallel mode, together with gate means having inputs, and an output, said inputs coupled to receive said latch means outputs and having an output coupled to control said writing means.

11. The invention claimed in claim 9 wherein said detector means is disposed in said portable electronic device, said detector means comprising first gate means having inputs coupled to receive in parallel the contents of a selected said memory section, second gate means controlling the writing of data into said selected memory section, said second gate means being controlled by said first gate means to permit the writing of data into said selected memory section when said section does not contain any data, and a memory device coupled between said first and second gate means, said memory means arranged to store the active state of said first gate means for at least the duration of a complete writing cycle of said writing means.

12. The invention claimed in claim 11 wherein said detector means further comprises latch means coupled between memory address input means and said memory means and controlled by said first gate means through the intermediary of said memory device, whereby said latch means operates to prevent any change in the address of said selected memory section during at least said writing cycle.

13. The invention claimed in claim 12 wherein said memory device is a flip-flop coupled to be actuated when operating voltage is applied to said portable electronic device.

14. The invention claimed in claim 9 wherein said memory means is organised in nm words each of 1 bit, and including counter means arranged to address said memory means bit by bit, clock means coupled to drive said counter means under control of said first gate means, shifting register means having an input coupled to receive output data from a selected section of said memory means in serial mode and having outputs at which said data appear in the parallel mode, and wherein a signal appearing at said first gate means output when said selected memory section does not contain any data is coupled to second gate means thereby to prevent change in said selected memory section, to said counter means to cause said counter to count downwards and to said clock means to cause said clock means to drive said counter means until $n$ clock pulses have been applied thereto, whereby an unprogrammed section of said memory means is selected and bit by bit writing into said unprogrammed section is permitted when said counting is complete.

15. The invention claimed in claim 14 wherein said first gate means is coupled to said clock means to control driving of said counter means through the intermediary of $1/n$ divider means and flip-flop means whereby said counting operation is stopped when $n$ clock impulses have been applied to said counter means.

16. The invention claimed in claim 15 and further comprising latch means coupling said first gate output to control said writing means, $1/n$ divider means having an input coupled said clock and means coupling the output of said $1/n$ divider means to control said latch means.

17. The invention claimed in claim 14 wherein said counter means has a counter output coupled through the intermediary of a flip-flop means to close gate means included in said memory means address circuit.

18. The invention claimed in claim 9, wherein said memory means is organised in $m$ sections each of $n$ bits, said memory means having an electronic address means comprising counter means driven by clock means and a memory module addressed bit by bit by said clock means, and wherein said detector means is included in said portable electronic device, said detector means comprising gate means having inputs coupled to receive in parallel the contents of a memory section addressed by said counter means latch means coupled in series with said gate means, said latch means receiving an actuating signal every $n$ address pulses through the action of $1/n$ divider means fed with clock signals, means coupling said gate means to enable said writing means by way of said latch means, whereby said writing means is enabled when said addressed memory means section does not contain any data.

19. The invention claimed in claim 18, wherein said memory module comprises:

a memory device organised in $m$ sections each of $n$ bits, said memory device having reading and writing connections connected to respective reading and writing selector switches;

a multi-conductor memory address circuit;

latch means in said address circuit and coupled for actuation in response to said writing means;

one portion of said memory address conductors of said address circuit passing through said latch means to said memory device;

and another portion of said memory address conductors passing directly to said reading and writing selector switches.

20. The invention claimed in claim 1 wherein said inhibitor means comprises:

coding means whereby certain of said memory sections are coded as prohibited;

coded-section detector means arranged to inhibit the enabling of said data-transfer means when an addressed memory section is coded as prohibited and to permit the enabling of said transfer means when said selected memory section is not so coded.

21. The invention claimed in claim 20 wherein said coding means are incorporated in said portable electronic device.

22. The invention claimed in claim 21 wherein said coding means are inaccessible from the exterior of said portable electronic device.

23. The invention claimed in claim 21 wherein said memory means is organised in words of $n$ bits and comprises input/output circuits for reading and writing thereof composed of $n$ conductors, and wherein said coding means comprises means whereby a predetermined one of said $n$ bits has a predetermined logic value (1 or 0) and said coded section detector means is connected to that one of said $n$ conductors of said input/output circuits which corresponds with said predetermined one of said $n$ bits.

24. The invention claimed in claim 23 wherein said predetermined one of said $n$ bits is the $n$th bit of said data words.

25. The invention claimed in claim 23 wherein said coded-section detector means includes gate means controlling said writing operation.

26. The invention claimed in claim 21 wherein said coded section detector means includes address comparator means having one input connected to memory address circuit means and another input connected to said coding means, said address comparator means having an output coupled to inhibit a writing gate when a selected address is a prohibited address.

27. The invention claimed in claim 26 wherein said coded section detector means coupled to said writing gate by way of a further gate, said further gate having an enabling input circuit arranged for irreversible modification whereby said further gate is held permanently in the open condition.

28. The invention claimed in claim 21 wherein said coded section detector means include decoding gate means coupled to address means of said memory means, said decoding gate means operating to detect the boundary address of a prohibited section of said memory.

29. The invention claimed in claim 28 wherein said decoding gate means is coupled to enable said data-transfer means by way of a flip-flop.

30. The invention claimed in claim 29 wherein said flip-flop circuit is provided with an enabling circuit capable of irreversible modification thereby to determine the state of said flip-flop.

31. The invention claimed in claim 20 wherein said data-transfer device comprises reading means and wherein said inhibitor means is coupled to said detector means thereby to inhibit the reading of memory sections coded as prohibited, and wherein also said portable electronic device comprises data processing means connected to said memory control circuits, said data processing means being operable to process, within said portable device, data contained in said memory sections of which external reading is prohibited.

32. The invention claimed in claim 1 wherein said data-transfer device further comprises:

reading means operable to read data from said memory in said portable electronic device;

data input means operable to introduce data directly into said data-transfer device; and data processing means coupled to said reading means to receive data from said memory means and to said data input means to receive said data introduced directly into said data-transfer device.

33. The invention claimed in claim 32 and including means responsive to the result of said data processing to control a further device.

34. The invention claimed in claim 32 and further comprising data-storage means coupled to said data processing means to store the result of said data processing.

35. The invention claimed in claim 32 wherein said portable electronic device comprises a further memory means containing fixedly programmed identification data and said data-transfer device further comprises identification comparator means and data-input means operable by the bearer of said portable electronic device to introduce data into said data-transfer means, said identification comparator means having inputs couplable to said further memory means and to said data input means to compare said identification data with said introduced data and having an output coupled to enable the operation of said data transfer device when the compared data are in agreement.

36. The invention claimed in claim 35 wherein said portable electronic device includes two separate sets of recording sections and wherein said data-processing means comprises at least one adder/subtractor means couplable to sum data contained in each said set with data introduced into said data-processing device and to develop the difference between the two sums thus obtained.

37. The invention claimed in claim 32 wherein said data-transfer device further comprises data display means couplable to said memory means to display data contained therein.

38. The invention claimed in claim 32 wherein said data-transfer means includes print-out means and means coupling said data-processing means to said print-out means whereby to obtain a printed record of said data processing.

* * * * *